July 28, 1959     R. I. ROTH     2,896,844

ACCOUNTING MACHINE CONTROLLED BY DIFFERENTLY CODED CARDS

Filed Oct. 25, 1956     16 Sheets-Sheet 1

INVENTOR.
ROBERT I. ROTH
BY
ATTORNEY

July 28, 1959 R. I. ROTH 2,896,844
ACCOUNTING MACHINE CONTROLLED BY DIFFERENTLY CODED CARDS
Filed Oct. 25, 1956 16 Sheets-Sheet 2

INVENTOR.
ROBERT I. ROTH
BY
J. W. Lowritzer
ATTORNEY

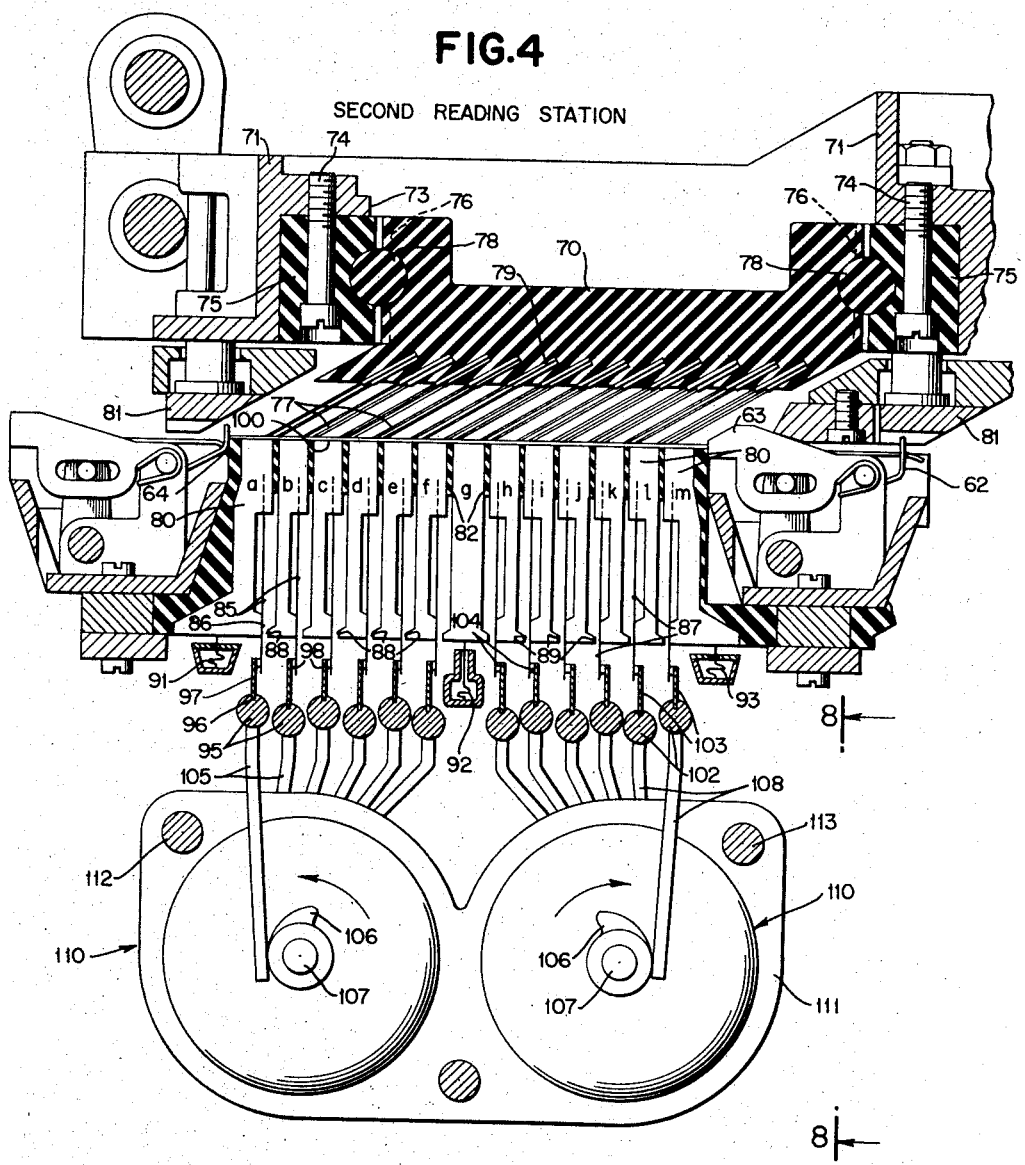
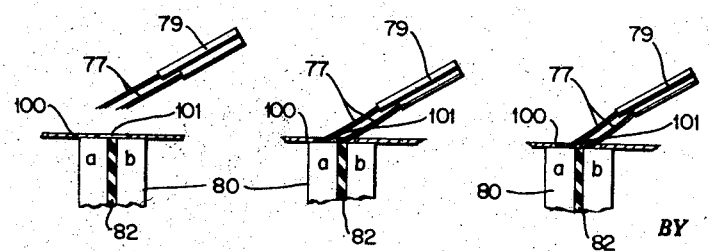

July 28, 1959                 R. I. ROTH                 2,896,844
ACCOUNTING MACHINE CONTROLLED BY DIFFERENTLY CODED CARDS
Filed Oct. 25, 1956                               16 Sheets-Sheet 4

INVENTOR.
ROBERT I. ROTH
BY
ATTORNEY

July 28, 1959     R. I. ROTH     2,896,844
ACCOUNTING MACHINE CONTROLLED BY DIFFERENTLY CODED CARDS
Filed Oct. 25, 1956     16 Sheets-Sheet 5
FIG. 10
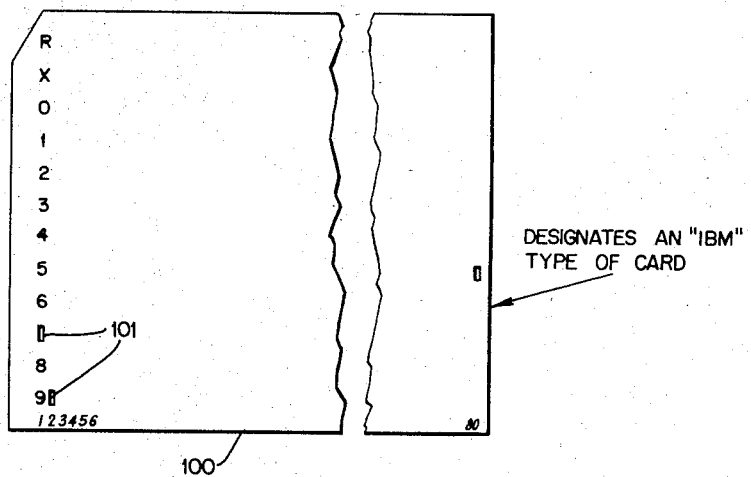
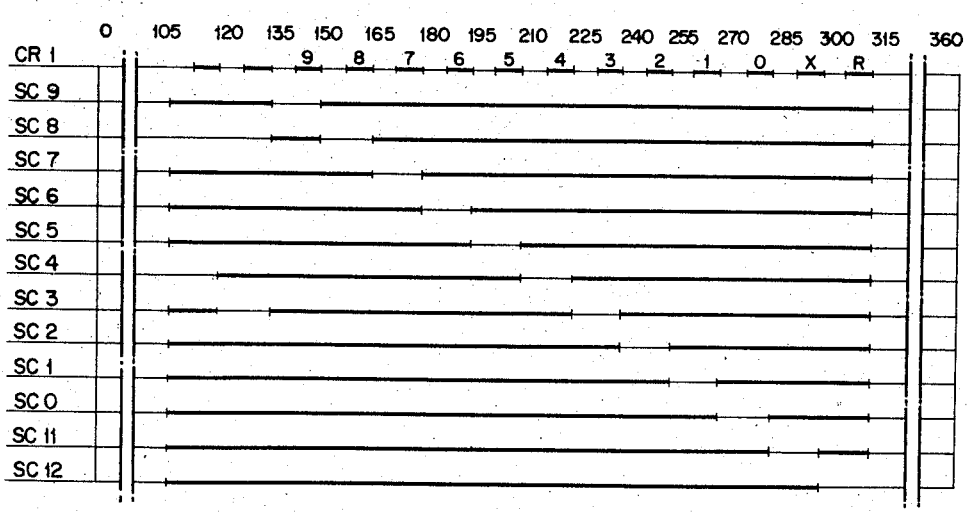
FIG. 11
INVENTOR.
ROBERT I. ROTH
BY
ATTORNEY July 28, 1959 R. I. ROTH 2,896,844
ACCOUNTING MACHINE CONTROLLED BY DIFFERENTLY CODED CARDS
Filed Oct. 25, 1956 16 Sheets-Sheet 6

*INVENTOR.*
ROBERT I. ROTH
BY
*F. W. Lownitzer*
ATTORNEY

July 28, 1959 R. I. ROTH 2,896,844
ACCOUNTING MACHINE CONTROLLED BY DIFFERENTLY CODED CARDS
Filed Oct. 25, 1956 16 Sheets-Sheet 7

INVENTOR.
ROBERT I. ROTH
BY
ATTORNEY

| FIG. 16a | FIG. 16b | FIG. 16c | FIG. 16d | FIG. 16e |
|---|---|---|---|---|
| | | FIG. 16f | FIG. 16g | FIG. 16h |

INVENTOR.
ROBERT I. ROTH
ATTORNEY

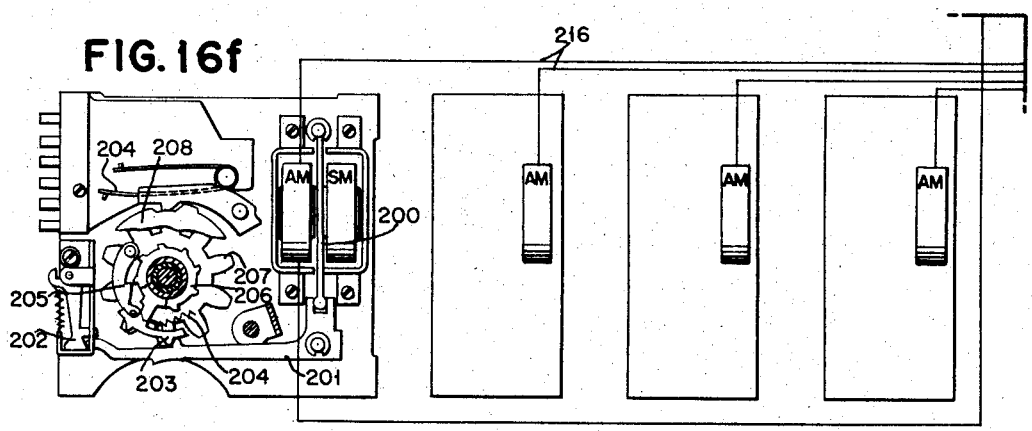

INVENTOR
ROBERT I. ROTH
BY
J. W. Lomnitzer
ATTORNEY

United States Patent Office 2,896,844
Patented July 28, 1959

2,896,844

ACCOUNTING MACHINE CONTROLLED BY DIFFERENTLY CODED CARDS

Robert I. Roth, Briarcliff Manor, N.Y., assignor to International Business Machines Corporation, New York, N.Y., a corporation of New York Application October 25, 1956, Serial No. 618,362

17 Claims. (Cl. 235—61.9)

This case relates to punched card machines and particularly to that type in which accounting and printing operations can be effected under control of punched cards.

In the present state of the art punched cards have been devised and utilized which are punched according to different codes and different forms of perforations, each having its own inherent advantages and subject to many corresponding disadvantages, and at the present time no card has been adopted which is a standard and useful in all types of commercial punched card accounting machines.

Among these different types of punched cards may be mentioned the conventional 80-column card with rectangular perforations shown in the patent to Lake, No. 1,772,492, the Tauschek type of card shown in British Patent No. 263,748, and various forms of combinational hole cards, such as Peirce, Lasker, etc. With respect to these combinational hole cards the code varies, such as 0, 1, 2, 4, 8; 0, 1, 2, 4, 7 and almost as many other numerical codes consistent with the types of cards shown in the prior art. Up to the present time the accounting machines controlled by these punched cards have been devised to be controlled solely by one type of card. This is because the manufacturer of the various forms of commercial machines has adopted his type of card and has produced a line of machines controlled solely by the type of punched card of his selection. For the proper operation of any of these accounting machines by other forms of punched cards for which they were not originally designed to control, structural changes were required to such an extent that it was not commercially feasible to devise a machine to be controlled by more than one type of card. With centralized accounting systems, such as public Service Bureaus demands may be made upon such Service Bureau to carry out statistical operations for different types of cards. It is thus with this requirement in mind and other inherent advantages of the present improvement that the present invention has been made.

Accordingly, it is then a broad object of the present invention to device a punched card machine of the accounting, sorting and the like type, which is responsive to different forms of cards passed through the machine and to devise such machine that the conditioning of the machine to respond to different forms of punched cards is effected automatically and without any changes required to be made by an operator of the machine.

Another object of the invention is to provide means automatically responsive to the presence of each different coded card for conditioning the machine in order that each type of card can control functions of said machine.

A further object of the invention is to place the means which conditions the machine to respond to different types of cards under control of card-type designations on the cards themselves.

Stated in other words it is a broad object of the invention to control the same punched card statistical machine by differently coded cards.

A still further object of the invention is to read or analyze differently coded cards and to emit the same kind of output digital data under control of each card and irrespective of the code utilized for each card.

More specifically it is an object of the invention to analyze by electrical means differently coded cards, emit as an output single differentially timed digit impulses which are the same for each type of card, and to automatically condition the analyzer to be responsive to each type of card.

Another object is to provide perforation analyzing means which can be utilized to read a standard single hole per digit 80-column card or either of two differently coded combinational hole cards and to automatically condition the analyzing means to be responsive to either type of card.

Another object is to provide punched card analyzing means which is automatically conditioned to be responsive to either single or dual-deck type of cards as they are presented to said analyzing means for analysis thereof.

A still further object is to provide punched card analyzing means that is responsive to interspersed cards which are differently coded.

Another object is to devise a decoding means for a plurality of different types of cards which is automatically responsive to each different type of coded card and to have said decoding means form a part of the punched card analyzing means.

Another object is to devise a punched card controlled machine having two reading stations and provide at each analyzing station means to analyze and decode various types of coded cards, whereby the same or differently coded cards may be read at the respective reading station.

Another object is to provide a decoding means for different kinds of coded card at each of a plurality of reading stations and to select the decoding means in accordance with the kind of coded card presented at the reading station.

Another object is to provide a decoding means for each card reading station and to select the desired decoding means in accordance with a suitable "kind-of-coded-card" designation on the card which is to be analyzed.

Another object is to provide a card analyzing means for different types of coded cards and which will function to decode each type of card whether a single or a plurality of cards of the same kind are presented to said card analyzing means.

Another object is to provide a card analyzing unit for a card controlled statistical machine which consists of a preliminary sensing station for sensing the "kind-of-coded-card" designation, a first reading station, and a second reading station, and means controlled by the preliminary sensing station for automatically selecting the desired decoding apparatus for each of the first and second reading stations, in accordance with the type of card presented at each of said stations.

Another object is to provide a punched card machine with a first reading station and a second reading station with means to sense either of two different types of coded cards at each of said stations and an automatic translating mechanism controlled by each of the first and second reading stations, whereby data entering operations may be effected in the same accumulator under control of at least two different types of cards or the same type of card at each of two reading stations.

Another object is to provide a punched card controlled statistical machine with accumulator entry and printing control devices and to cause the latter to be placed under control of a reading station which is provided with means to analyze and respond to different types of coded cards.

A further object in connection with the printing mechanism is to cause a reading station capable of analyzing different types of coded cards to control said printing mechanism in order that amounts represented on said plurality of differently coded cards are listed, irrespective of the form of card.

A further object is to devise a reading station with a decoding apparatus which is automatically operative in accordance with each type of card to decode said card and transmit differentially timed impulses to a plurality of plug hubs. Said cards may be either of the single or dual-deck and the plug hubs correspond in number to the digit representing capacity of each card, whereby said plug hubs in accordance with the desired operations wanted in the statistical machine may receive plug connections to the selected controlling instrumentalities, such as printing control magnets, accumulator control magnets, and auto control magnets.

Further objects and advantages of the invention will be evident as the specification progresses. It is not intended that the aforementioned exemplary objects be regarded as the sole objects of the invention since it is evident that the great flexibility and various operations which can be effected by the present machine have inherently other advantages too numerous to mention. Many of the features disclosed in the present machine can be used either singly or in various combinations, not only in the form of accounting machines shown herein but also in analogous forms of statistical machines, such as punching, sorting, collating, etc.

Other objects of the invention will be pointed out in the following description and claims and illustrated in the accompanying drawings, which disclose, by way of example, the principle of the invention and the best mode, which has been contemplated, of applying that principle.

In the drawings:

Fig. 4 is a transverse sectional view taken through the second reading station showing the detailed construction of the same card analyzer utilized for all the three different types of coded cards illustrated herein.

Figs. 5, 6 and 7 are detail views showing the manner of making brush contact through a hole in the card with a related pair of contact members.

Fig. 10 is a fragmentary view showing the conventional "IBM" type of card showing particularly the manner of perforating two columns to represent an amount "79" and showing the special perforation in column 80 for designating an "IBM" type of card for accordingly selecting the related code conversion circuits for this type of card.

Fig. 11 is a timing diagram illustrating the timing of cam contacts utilized to energize the rotary solenoids for contact bridging or electrical shunting purposes for code conversion circuits for an "IBM" form of card.

Figure 12:
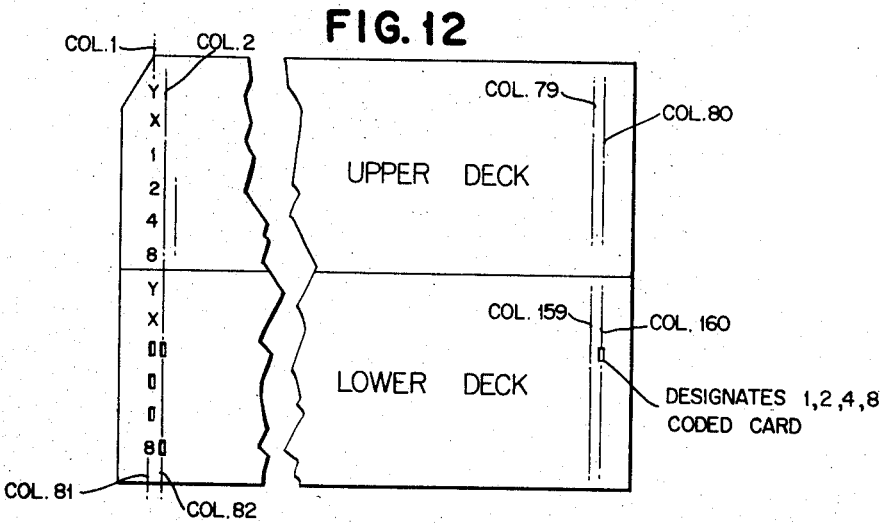

Fig. 12 is a fragmentary view of a double deck combinationally coded card utilizing the code 1, 2, 4 and 8 and also showing in column 160 a hole that designates such type of card and selects the necessary code conversion circuits.

Figure 13:
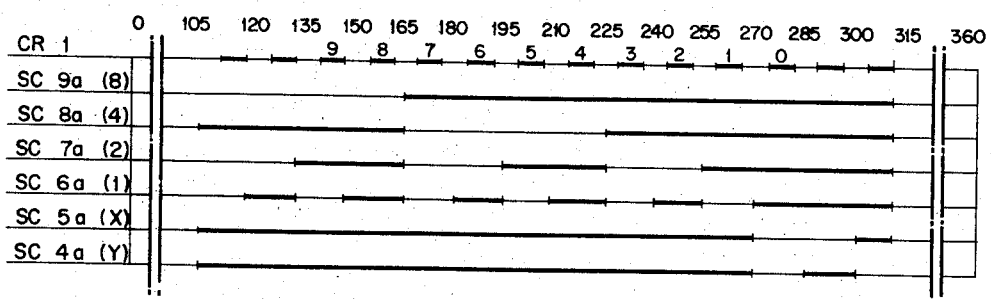

Fig. 13 is a timing diagram of electrical contacts employed in the electrical code conversion circuits when the combinationally coded card of the type shown in Fig. 12 is presented to either reading station.

Figure 14:
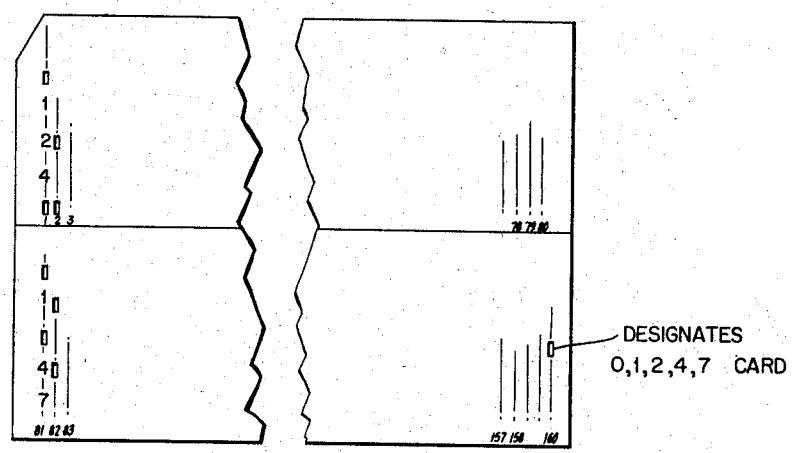

Fig. 14 is a fragmentary view showing a 0, 1, 2, 4, 7 type of combinationally coded card and illustrates the special designation in column 160 for selecting the appropriate code conversion circuits of the machine.

Figure 15:
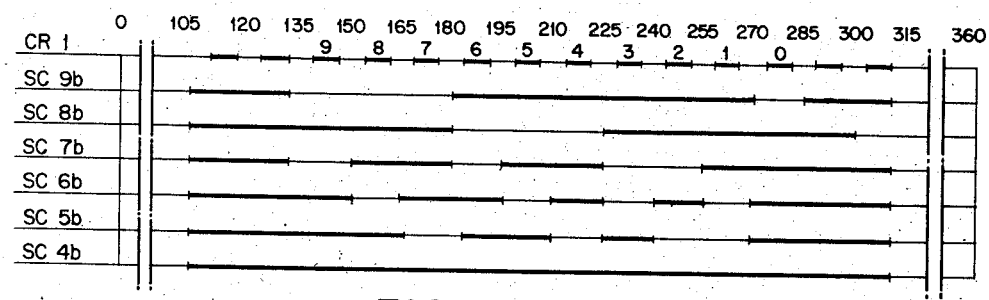

Fig. 15 is a timing diagram of cam contacts employed in the code conversion circuits for the type of combinationally coded card shown in Fig. 14.

Figs. 16a–16h inclusive comprise an electrical circuit diagram of the machine.

Figures 16A, 17:
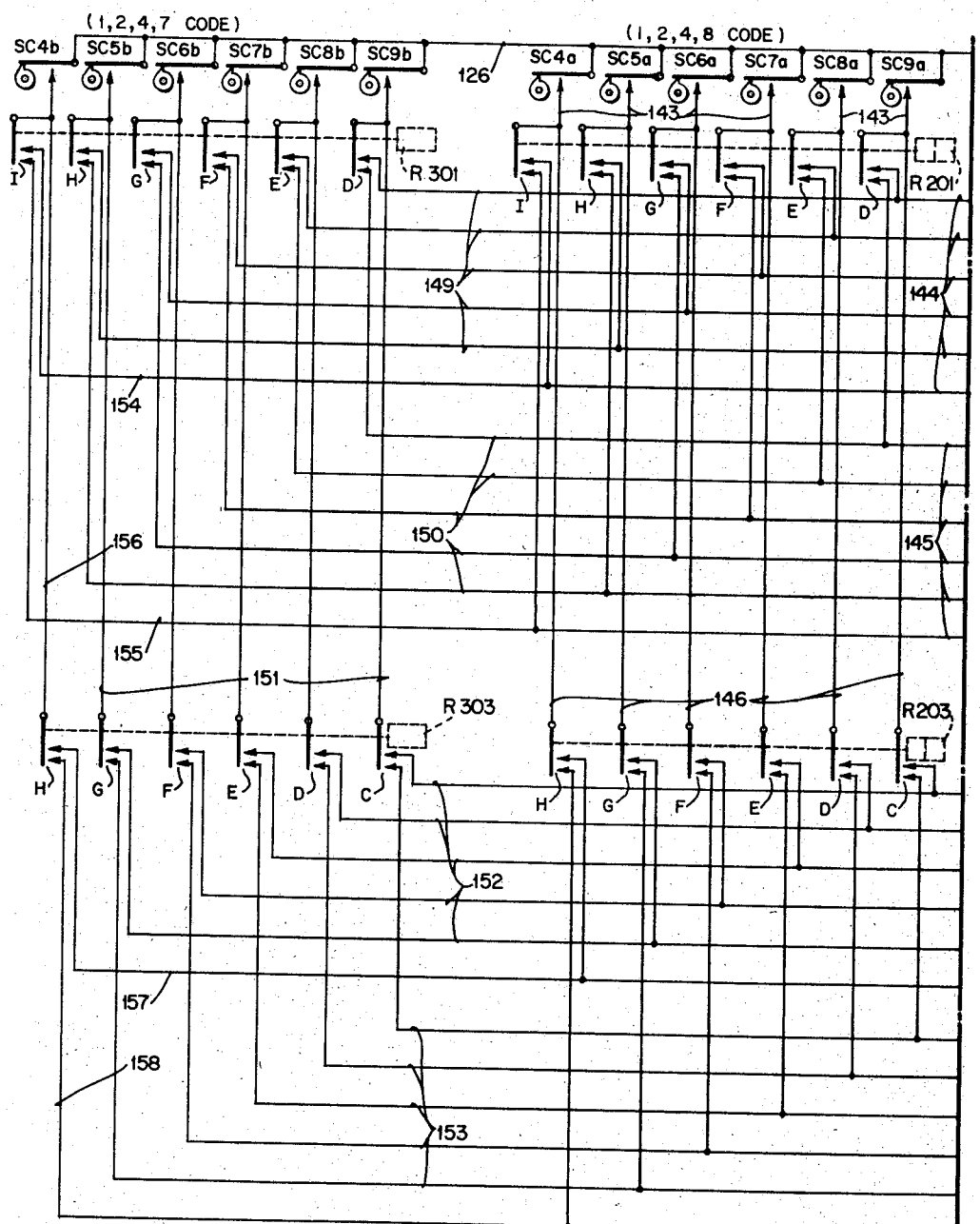
Figure 16B:
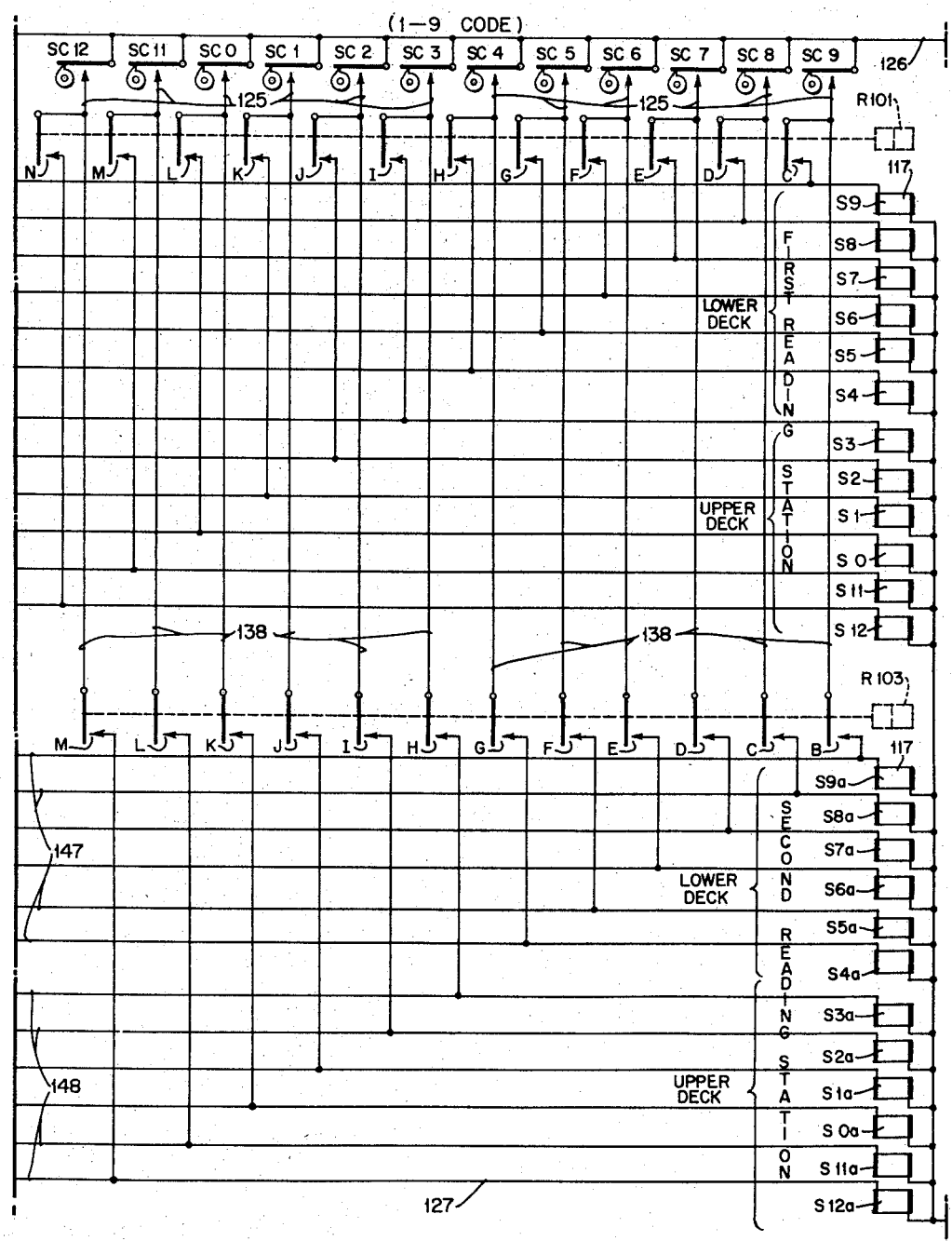

Fig. 17 is a diagram showing the manner of assembling the sheets of Figs. 16a–16h of the electrical circuit.

Fig. 18 is a timing diagram of the cam controlled contacts utilized in the circuit diagram of Figs. 16a–16h.

Figure 19:
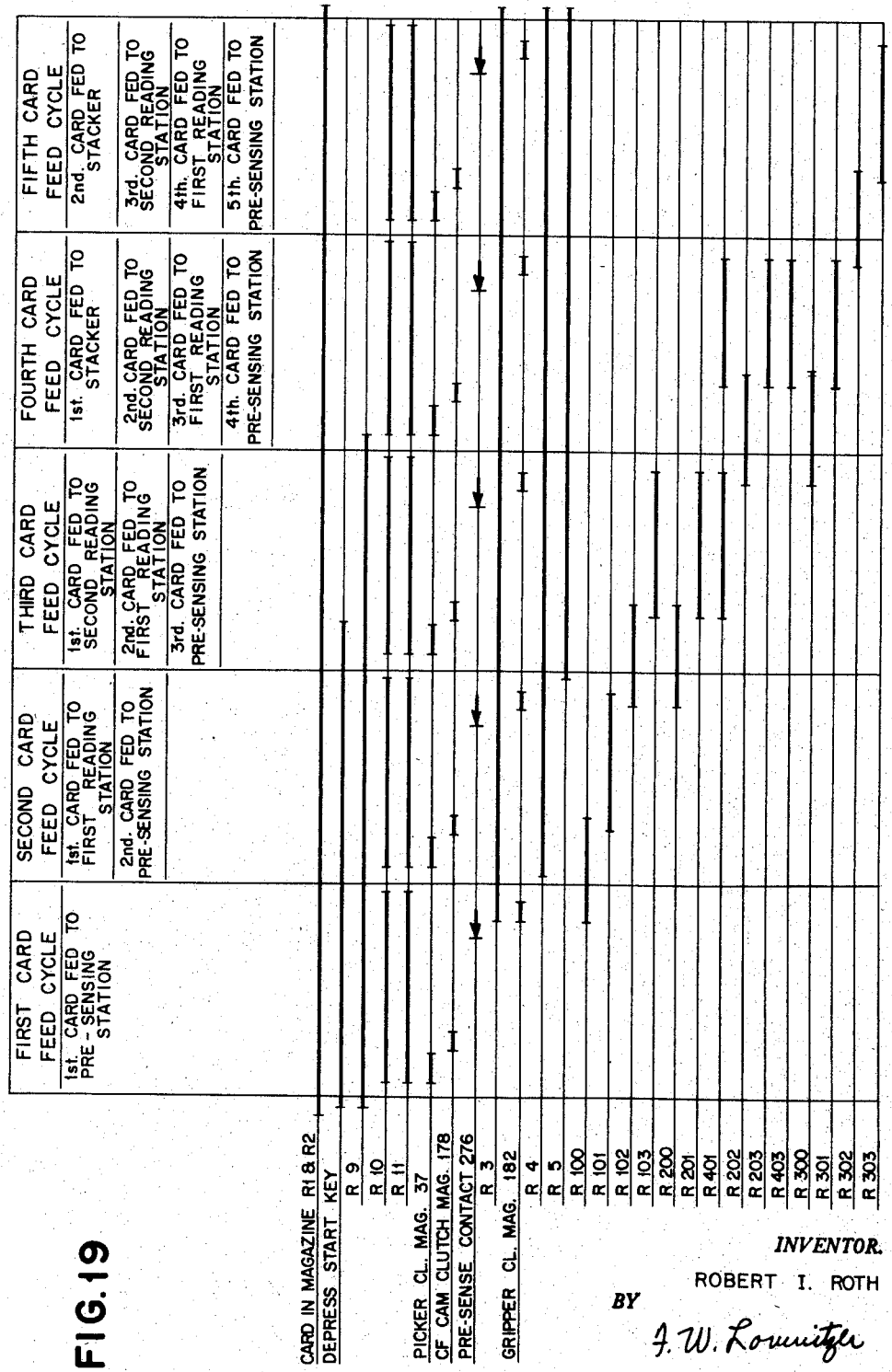

Fig. 19 is a sequence diagram showing the sequence of events in successive cycles of the machine and said diagram also shows the time of energization of the relays for five representative card feed cycles.

Card storage hopper

The card storage hopper 23 (Fig. 1) comprises a base plate 21 and two slotted side plates 22, each of which is pivoted on a stacker drum shaft 24. The card storage hopper 23 receives cards fed by a stacker drum 25 after such differently coded cards have passed through the machine to be analyzed and translated in a manner according to the present invention.

Card supply magazine

Suitable side plates 26 (Fig. 1) together with a back plate 27 provide a card supply magazine 28 from which differently coded cards are fed singly for their presentation to the different reading stations.

Card feed from supply magazine

A conventional card picker is provided to feed cards singly from the supply magazine and includes a card picker 29 (Fig. 1) having a swivel mounting on a slidably mounted rack 30, all of which parts are carried by the lower section of the card feeding unit. Said rack 30 is operated by a segment arm 31 secured to a rocker shaft 32. To the rocker shaft 32 there is secured a depending arm 33 which has a link connection 34 to an arm 35 secured to a rocker shaft 36.

Figure 2:
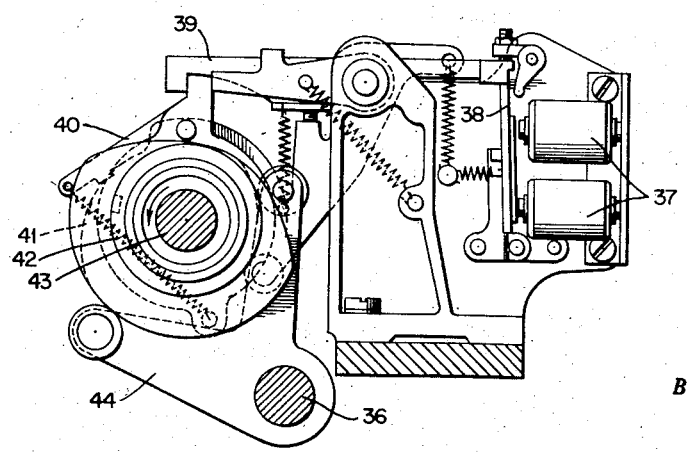
Fig. 2 is a detail view of an electromagnetically controlled card feed clutch.

To effect selective card feed operations there is provided a one-revolution clutch which is controlled by a card feed clutch control magnet 37 (Fig. 2). As in the well known construction the armature 38 thereof rocks a clutch release arm 39 which enables a pawl 40 pivoted on a member to engage a notch formed in a disk 42 secured to the drive shaft 43, which shaft 43 corresponds to shaft 52 in Patent No. 2,514,031. Said member is secured to complementary cams 41 loose on the clutch drive shaft 43. When such clutch engagement is effected shaft 43 will drive the complementary cams 41 a complete revolution. Cooperating with the complementary cams is a follower bell crank arm 44 secured to the rocker shaft 36. Rocking of said shaft by the complementary cams 41 will, through the mechanical linkage just described, reciprocate the picker to feed a card from the magazine.

By electrical circuits to be described later, an impulse is transmitted to the clutch control magnet 37 to cause the clutch engagement and feeding of the lowermost card to the constantly rotating feeding rollers 47, 48. Such rollers feed the card from the beginning of the cycle up to about 200° of the machine cycle to feed the card to the first sensing station, known in the present machine as a "Presensing Station." If a card reaches such presensing station, further card feed operations are effective by grippers so as to feed the card to the first card reading station.

This station is designated a presensing station because it has at such station a card operated lever and associated contacts for controlling the ensuing card feed operations dependent upon feeding of a card to this station. The Presensing Station is preferably provided with photocell means to pre-analyze special designations on the card indicating the particular code used for that card for adjusting the machine by selection of the related code conversion and entering circuits.

After the card has been analyzed at both analyzing stations it is received by the stacker drum 25 (Fig. 1) of a conventional construction and since its construction and operation is well known it will only be generally stated that such stacked drum 25 receives a card, turns it over, and deposits it in the card storage magazine 23 and in the same order that the cards are originally stacked in the supply magazine 28.

*Card gripping devices*

As fully shown and explained in more detail in the patent of G. F. Daly, No. 2,510,559, issued June 6, 1950, cards are positively moved from station to station without the use of the customary feeding rollers and is preferably performed by the use of card gripping devices. Reference has been made to the so-called "Presensing Station" and by control disclosed in the aforementioned patent the presence of a card at such station enables the closure of the grippers to seize each card at opposite marginal edges and effect reciprocation of the gripper frames to feed the card to the next station or to the stacker drum. The first station has been designated as the "Presensing Station" (see Figs. 1 and 3); the second is known herein as the "First Reading Station" which is used for control purposes in a customary card controlled accounting machine and the third station designated as the "Second Reading Station," having the function designated by this legend.

In view of the detailed disclosure in the aforementioned Daly Patent No. 2,510,559, it is thought unnecessary to give a detailed description of such card gripping and feeding devices. In general, there is provided at the right side of the card feeding unit in the lower section a reciprocable gripper frame 51R (Fig. 3) carrying card grippers 52, 53 and 54. At the other side of the machine the companionate reciprocable gripper frame 51L carries grippers 55, 56, 57. Obviously, from Fig. 3 it will be evident that grippers 52 and 55 feed the card from the Presensing Station to the First Reading Station and simultaneously grippers 53 and 56 move a card from the latter designated station to the Second Reading Station and grippers 54 and 57 feed a card from the Second Reading Station to the stacker drum 25.

When three cards are at their respective stations the concomitant movement of the gripper frames 51R and 51L and their grippers will feed three cards during the same machine cycle.

Each gripper frame 51L or 51R consists of a U-shaped frame carrying ball bearing mounted wheels which roll over a lower track and underneath an upper track carried by the lower side plates of the card feeding mechanism. As previously stated when cards are to be fed from station to station, the grippers carried by the frames are simultaneously released, that is, they close upon themselves to seize the marginal edge of the card to cause the cards to be fed to the next position as the gripper frames are moved. When the cards are in the next position the grippers are then opened and the gripper frames are returned idly to normal position. The means for closing the grippers and for reciprocating the gripper frames to the left in a card carrying stroke and to the right in an idle stroke is full shown in the patent to G. F. Daly, No. 2,510,559.

*Card stops and aligners for horizontal edges of cards*

Also as more fully described in the patent to G. F. Daly, No. 2,510,559, the card feeding unit shown herein is provided with means to align the card along the horizontal edges to accurately correlate the horizontal rows of index points of the cards with the related rows of analyzing brushes.

Figure 3:
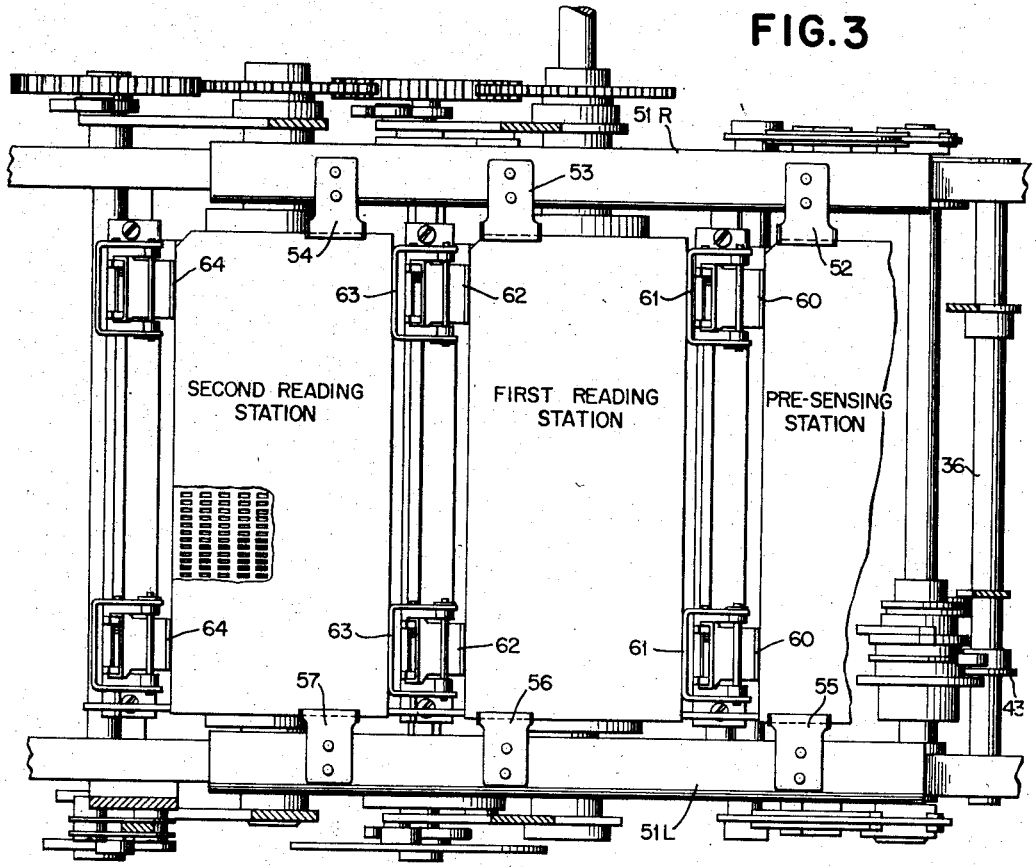
Fig. 3 is a plan view of the card feeding mechanism also showing the successively effective, presensing and the first and second reading stations.

In general, at the Presensing Station the card is aligned between the bight of the feed rollers 47 and 48 (Fig. 1) and two aligners 60 (see Fig. 3). The card at the First Reading Station is aligned between card stops 61 and aligners 62 and the card at the Second Reading Station is aligned between the card stops 63 and aligners 64.

The card stops 61 and 63 cooperate with the trailing horizontal edges of the cards at the First Reading Station and Second Reading Station and comprise a bail plate which is urged downwardly against the action of a spring as the card is being fed by the grippers. When the trailing edge passes by the card stops, said stops are spring-urged upwardly to present a square aligning surface to the trailing edge.

The aligners 60, 62 and 64 are, however, movable to the right and upwardly so as to shift the related card to the right to correct the over-feeding of the cards purposely given thereto. As fully described in the aforementioned Daly patent, these aligners are normally below the plane of the cards as they are being fed by the grippers. When the cards have been fed to the respective stations and have been released by the opened grippers, the aligners 60, 62 and 64 are thereupon moved to the right and at the same time upwardly so as to coact with the leading edge of the respective card. This will shift each card to aligned position to accurately align the rows of analyzing brushes with the rows of index points.

*Vertical card edge aligners*

Also as fully shown and described in the aforementioned Daly patent, the machine is provided with vertical card edge aligners which are disposed at the First Reading Station and the Second Reading Station. These coact with the vertical or shorter edges of the card so as to shift the card whenever there is any deviation of the card from its proper line or direction of feed. These aligners are not shown herein but it is to be assumed that to accurately analyze the card perforations they are preferably included in the machine and are preferably of the structure shown and described in the aforementioned Daly patent.

*Analyzing mechanism*

The analyzing mechanism for the perforated records which represent data by different codes is preferably of the type which analyzes the records while they are at rest, and conveniently may be the type shown in the patent to R. E. Page et al., No. 2,484,114 modified as shown in the application of Robert I. Roth, Serial No. 588,838, filed June 1, 1956, now Patent No. 2,807,415.

Such analyzer shown in Figs. 4 to 9 is adapted to analyze not only the 80-column "IBM" type of perforated record shown in the patent to C. D. Lake, No. 1,772,492, granted August 12, 1930 and Fig. 10 herein but to also analyze combinationally coded cards, either single or double deck, such code being for illustrative purposes the 0, 1, 2, 4, 7 code; the 0, 1, 2, 4, 8 code, or other combinational codes, depending upon the desired code selection.

The construction of each analyzer at each reading station is alike and is therefore described only for the second reading station shown in Fig. 4. In more detail, the analyzing means shown in the aforementioned patent to R. E. Page et al., No. 2,484,114 and the application of R. I. Roth is provided as shown in Fig. 4 with an analyzing plate 70 for each vertical card column, which analyzing plates 70 are carried by a reciprocable frame member 71 consisting of a single metallic casting. The frame member 71 is formed so as to be capable of holding for each reading station 80 analyzing plates 70 for a corresponding number of vertical card columns. Each analyzing plate or brush carrying unit comprises a plate of insulating material which in thickness is less than the width of a card column and the plurality of brush carrying plates 70 are mounted on the frame member 71 separated from each other. The 80 analyzing plates 70 are mounted so as to fit or pass through a rectangular opening 73 formed in the frame member 71. By means of mounting screws 74 transverse bars 75 of insulating material are carried by the frame member 71 and said bars 75 are formed with slots 76 which receive the analyzing plates 70 in such manner that they are spaced from each other but correlate the brushes 77 carried by the plates with the index point positions. The analyzing plates are locked in position on the frame member 71 by rods 78 of insulating material which fit in semi-circular cutout portions formed at the ends of the analyzing plates 70 and along the edge of each insulating bar 75.

Each analyzing plate is provided with inclined slots adapted to receive ferrules 79, each of which carries the respective analyzing brush 77. Brushes 77 are preferably inclined in the direction of card feed and are normally elevated while the cards are being fed to analyzing position. The analyzing brushes 77 are made up of two strands, both of which pass through a hole in the card to make contact with a pair of respective contact members 80.

The means for depressing the frame member 71 and analyzing plates 70 in a timed operation of the machine may consist of any suitable means, it only being essential that the frame member 71 is in lowered position between 105° and 315° of the timing diagram of Figs. 11, 13 and 15 of the machine cycle during which time test circuits are operable at differential times to determine the pairs of contact members 80 shunted by the brushes 77 and accordingly transmit a digit impulse. The feeding means previously described may be provided for feeding the cards in a successive manner to the analyzing means. Such feeding means feeds a card to the analyzing means so that the latter retains contact with the card during the time the electrical impulses are transmitted and thereafter feed said card out of the analyzing means in order to receive a successive card.

It is desirable to hold the cards stationary during an analyzing operation and to this end the patent to R. E. Page et al., No. 2,484,114 also shows clamping plates 81 which press the card 100 against the surface of the card feeding bed.

The groups of brushes 77 for each of the reading stations are normally up and above the card 100 to be analyzed. When the frame member 71 is initially moved downwardly said brushes 77 are adapted to pass through holes 101 (Fig. 5) when they are encountered or rest upon the top surface of the card.

Figs. 5, 6 and 7 show in detail the analyzing operation. As the frame member 71 is moved downwardly and each dual brush 77 encounters the card 100 as shown in Fig. 5, the left-hand brush passes through the rectangular hole 101 of the card to make contact with contact member 80a, and the right-hand brush of the pair rests upon an insulating strip 82 between a pair of contact members 80a and 80b. As the frame member 71 moves further downwardly and slightly to the right as shown by the relative positions in Figs. 6 and 7, the dual brush 77 will be slightly bent, the left-hand brush still making contact with the contact member 80a and the right-hand brush of the pair now making contact with the related contact member 80b. It is preferable to employ this form of actuation of the brushes as just described in order to make a firm contact between the brushes and the contact members underneath the card. To this end, it is desirable to employ mechanism in the card feeding mechanism for moving the frame member 71 to effect this mode of operation by employing the construction shown in the aforementioned patent to G. F. Daly, No. 2,514,031, issued July 4, 1950.

However, any other form of analyzing structure will also be satisfactory, provided that upon the passage of the analyzing brushes through the hole in the card they make contact with a pair of contact members and thereby electrically bridge or shunt them.

Figure 9:
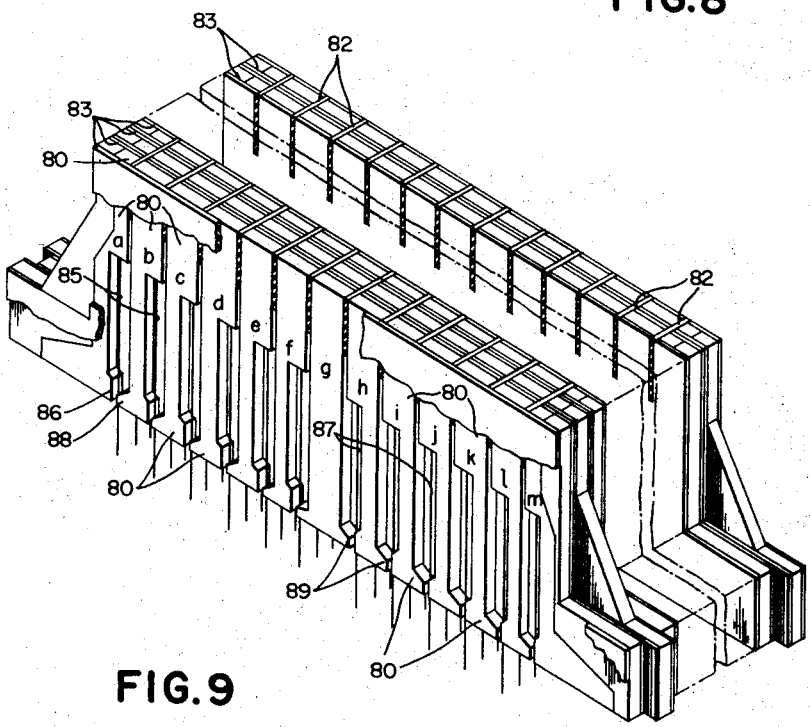
Fig. 9 is a perspective view of the analyzer showing an assembly of several sets of contact members arranged beneath the card so as to form a smooth card bed plate on which the card rests for analyzing operations.

From Figs. 4 and 9 it is evident that for each card column there are provided 13 contact members 80 designated a–m and they are so arranged in pairs that adjacent ones are shunted or bridged by a brush upon the occurrence of a hole. Therefore, it will be seen that with contact member 80a connected to one side of an electrical circuit, the circuit will be continued through contact member 80a, the left-hand brush, the ferrule 79, the right-hand brush to contact member 80b upon the occurrence of a hole, and if there is also a hole at the next index point position the circuit will be further continued to contact member 80c. It is obvious, therefore, that at hole positions of a card column, related pairs of contact elements 80 are electrically bridged or shunted. The insulating strips 82 are interposed between the adjacent contact members of each set of 13.

As best shown in Fig. 9 there is provided a set of contact members 80 for each of the 80 vertical card columns of the card. In order to insulate each series of 13 contact members 80 from the adjacent series, there is provided a series of insulating strips 83, best shown in Fig. 9. The 80 series of contact members 80 are adapted to be assembled as shown in the fragmentary view of Fig. 9 and are suitably clamped between the two ends to rigidly retain them in proper position and also to provide at the top a smooth bed plate over which the card may be fed without obstruction.

Fitting in each of the contact members 80a to 80f is a contact wire 85 (Figs. 4 and 9) tensioned so as to normally rest against a foot 86 of the contact member in which a spring wire 85 is fastened. Similarly, contact members 80h–m have inserted therein similar wires 87 and they too normally rest against the foot 86 of the related contact member. The group of contact wires 85 is adapted to be moved selectively at desired times so that each makes contact with a contact extension 88 of the next adjacent contact member and similarly the contact wires 87 are adapted to be moved to the left to make contact with contact extensions 89 of the contact member 80 next adjacent and to the left. In other words, by selective positioning of the wires 85 to the right, each is adapted to engage the contact member extension 88 of the next adjacent contact member so as to bridge or shunt a pair of members just as the brushes 77 would have done if there was a hole at that particular index point position. In a similar way, movement of the brushes 87 to the right to engage contact extensions 89 of the contact members 80 will bridge or shunt other pairs of contact members 80 just as other brushes 77 would have done if there were holes at these index point positions. Hence, it is possible by selectively positioning the wires to shunt or bridge contact members 80a–b, 80b–c, 80c–d, 80d–e, 80e–f and 80f–g. Correspondingly, the following pairs of contact members may also be bridged or shunted: 80g–h, 80h–i, 80i–j, 80j–k, 80k–l and 80l–m.

Hence, it is evident that bridging of the contact members 80 at the left is effected by positioning of spring wires 85 to the right and bridging of contact members 80 at the right is effected by the positioning of the spring wires 87 to the left. In order to make electrical connections to contact members 80a, 80g and 80m, there is connected to the respective contact members spring terminal wires 91, 92 and 93. For a card of the single deck type, such as a conventional "IBM" card, the test circuit is between terminals 91 and 93, whereas for the duo-deck type card the test circuit for the upper deck is between terminals 91 and 92 and for the lower deck between terminals 92 and 93.

For positioning the spring wires 85 to the right there is provided a series of rock shafts 95, each having a groove 96 in which is fitted a plate 97 carrying an insulating plate 98 which arrangement runs parallel to the long direction of the card so that each insulating plate 98 may, when rocked clockwise, shift 80 spring wires 85 all at the same time so as to effect the desired bridge or shunt between adjacent contact members. This arrangement is duplicated for the wires 87 and consist of a series of rock shafts 102 carrying plates 103 and which latter carry insulating plates 104 adapted when shafts 102 are rocked counterclockwise to move each series of 80 contact wires 86 to the left so as to bridge or shunt adjacent contact members.

As will be clearer later on from a description of the circuit diagram, it will be seen that initially in accordance with the holes in the card certain pairs of adjacent contact members are retained shunted by the brushes when there is a hole at respective index point positions. One or more pairs of contact members may be shunted for each vertical card column in accordance with the number of holes therein. There then remains the necessity of bridging or shunting those contact members which have not been shunted by the brushes 77 and which is, in accordance with the construction of the present analyzer, effected by the spring contact wires 85. The remainder are bridged or shunted at differential times depending upon the contact members initially shunted. This differential bridging or shunting of the remaining pairs of contact members 80 enables the transmission of a differentially timed electrical impulse. For shunting or bridging the remaining pairs of contact members 80, it will be recalled that shafts 95 are rocked clockwise and shafts 102 counterclockwise and each of said shafts may be rocked by any suitable means and herein it is effected by means of rotary solenoids of a construction now to be explained in detail. Each rock shaft 95 has a depending cam follower 105 urged by a series of spring wires 85 against a cam 106 secured to a rock shaft 107. Similarly, the rock shafts 102 have follower arms 108 rocked by their respective cams 106 secured to the rock shaft 107 of the respective rotary solenoid. The preferred construction of each rotary solenoid 110 is best shown in Fig. 8.

For supporting each of the series of rotary solenoids 110, there is provided a mounting plate 111 for each two solenoids as shown in Fig. 4 and which is supported by fixed rods 112 and 113.

Figure 8:
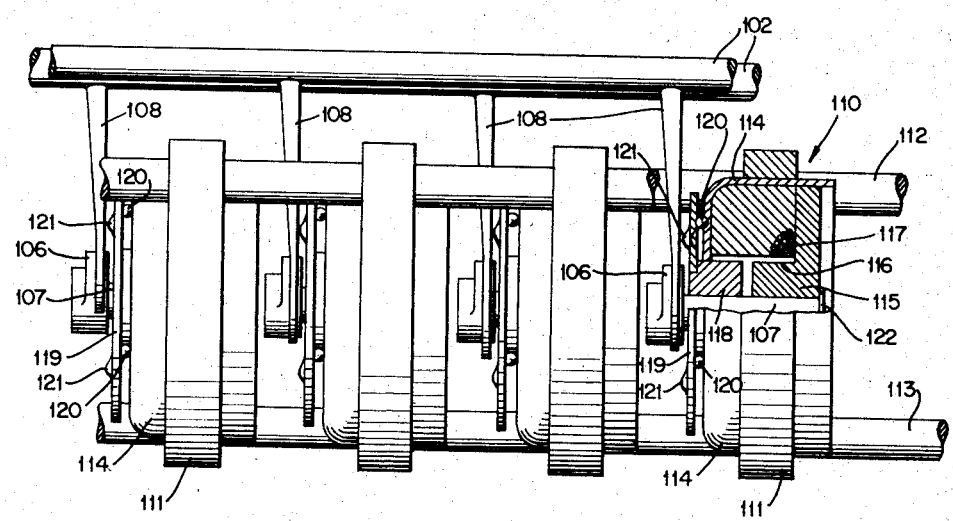
Fig. 8 is an end elevational view taken on the line 8—8 of Fig. 4 showing an assembly of the rotary solenoids and one of them fragmentary to show the general construction.

As is best shown in Fig. 8 the support plate 111 is suitably apertured so as to receive the enclosing casing 114 of the rotary solenoid. Said casing is enclosed at one end by an annular disk 115 apertured to receive the shaft 107 and to allow a slight reciprocating movement therein. The enclosing casing and a shoulder 116 of the annular disk 115 provides a recess for the doughnut type solenoid winding or electromagnetic coil 117 of the rotary solenoid. Fixed to the shaft 107 is a disk 118 attached to which is an armature disk 119. Said armature disk is adapted when the electromagnetic coil 117 is energized to be attracted to the right. The outside of the casing 114 is notched to receive balls 120 which are three in number and said balls coact with the respective inclined notch 121 formed in the armature disk 119. It is obvious, therefore, when said electromagnetic coil 117 is energized it will attract its armature disk 119 and by the coaction of the balls 120 with the inclined cam notch 121, said armature disk will be rotated slightly and since the shaft 107 and cam 106 are connected to the armature disk said cam 106 will be rotated to rock the respective shaft 95 or 102 in the proper direction. Upon the de-energization of the coil 117 said armature disk 119 is restored by a coil spring 122 or other suitable means, thereby rocking shaft 107 in the reverse direction. Rocking of shaft 107 rocks the related rock shaft 95 or 102, thereby moving the respective contact wires 85 or 87 to bridge or shunt pairs of contact members 80.

There will now be explained in connection with the wiring diagram the mode of operation of the analyzer and related emitter circuits to understand how three differently coded records may be analyzed and converted to differentially timed electrical impulses.

*Mode of analyzing and digit transmitting operations for "IBM" 80-column punched cards*

Upon an occurrence at either reading station of a conventional "IBM" punched card shown in the patent to C. D. Lake, No. 1,772,492 and in Fig. 10 herein, the sensing of a special hole designating this type of card at the Presensing Station selects code conversion circuits to cause the related analyzer to transmit digit impulses in a common code in accordance with the numerical representing holes on the card. These code conversion circuits energize coils 117 of the rotary solenoids 110 at differential times so that they operate the rotary solenoids to cause the bridging of those contact members 80*a–m* which have not been bridged by the brushes 77 passing through the card holes.

Figure 16C:
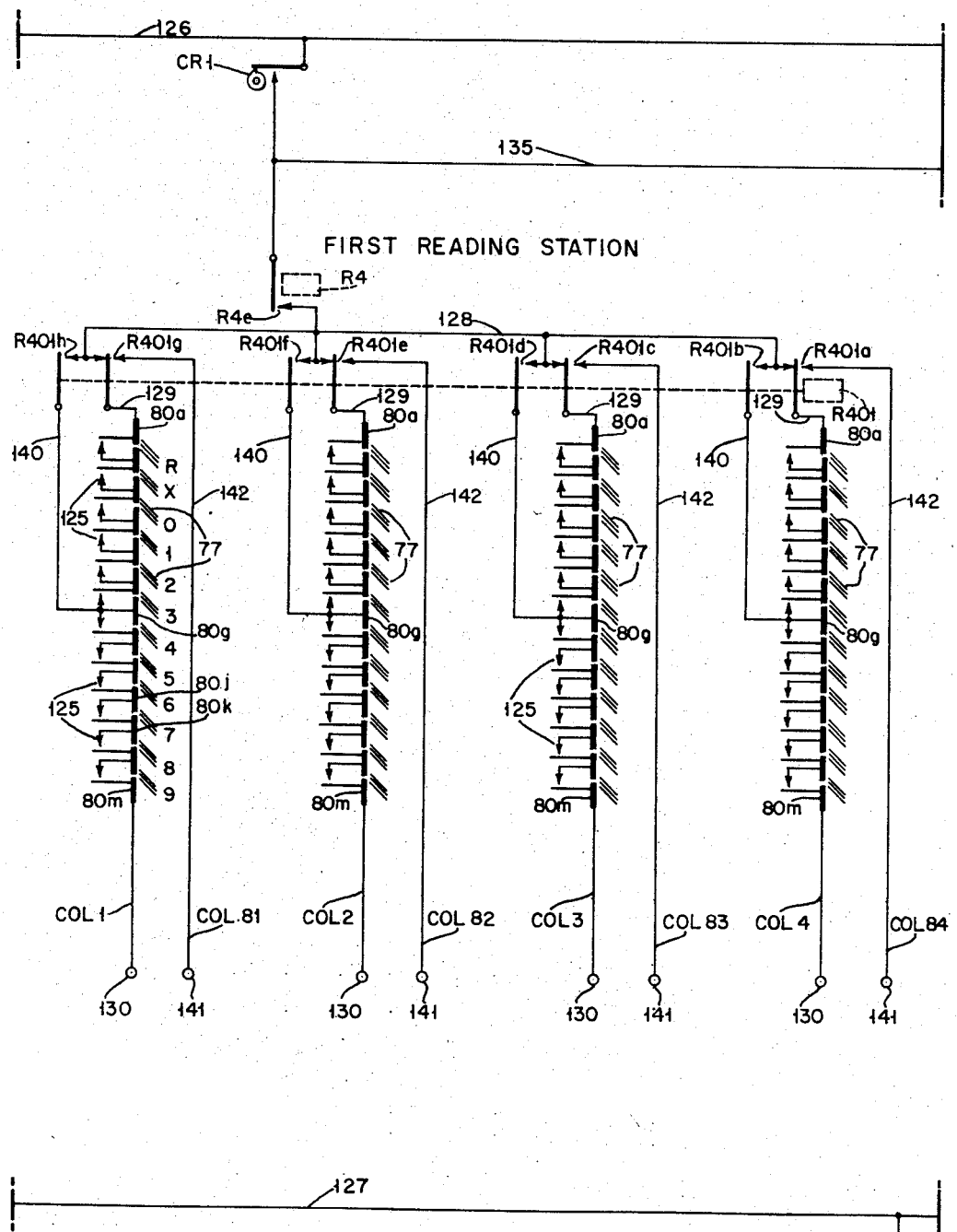
Figure 16D:
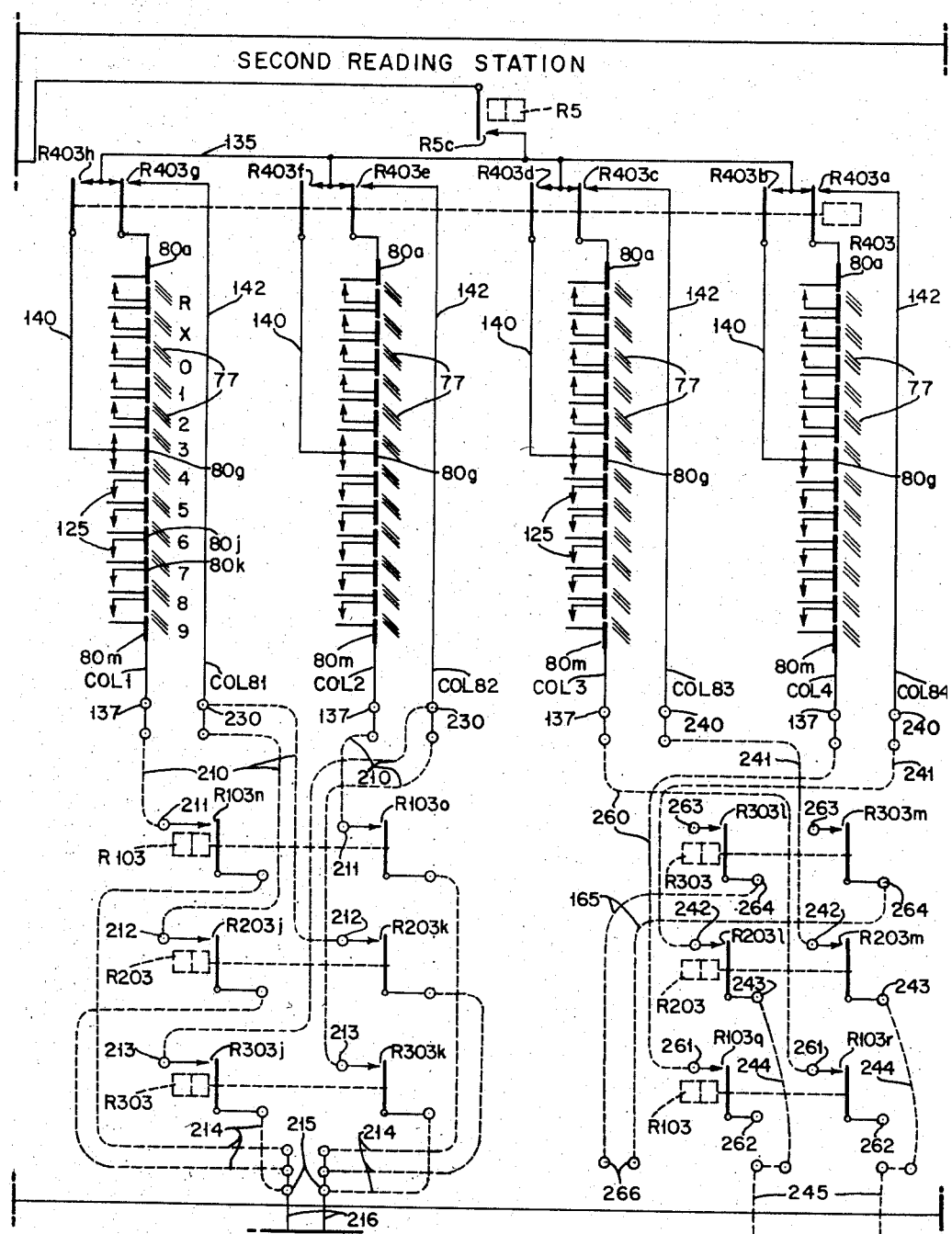

In order to avoid a repetition of the showing of the detailed structural arrangement, the analyzer of Fig. 4 is shown diagrammatically in the wiring diagram of Figs. 16*c* and 16*d* for the first and second reading stations wherein it will be seen that each dual strand analyzing brush 77 shunts or bridges a pair of adjacent contact members 80 when such brush passes through a perforation. It will be recalled that at certain times in the operation of the machine the shifting of the contact wires 85 or 87 to the right or left (see Fig. 4) to engage foot portions 88 and 89 of adjacent contact members will, in the same manner as the brush 77, shunt or bridge a pair of the contact members 80. In the wiring diagram of Figs. 16*c* and 16*d* this electrical shunting means is shown for simplicity as contacts identified by numeral 125. Reference numerals 126 and 127 represent the electrical supply lines. From the line 126 a circuit is extended through CR1 cam contacts (see Fig. 16*c*) which have the impulse timing shown in Figs. 11, 13 and 15 and provide the source of differentially timed electrical impulses which are selected according to the brushes 77 which pass through holes in the card.

Upon occurrence of a conventional "IBM" card 100 the sensing of its type of card designation at column 80 (Fig. 10) will, by circuits to be described later, energize a relay R101 (Fig. 16*b*) to close its series of contacts R101C–N (Fig. 16*b*), thereby causing the solenoids S9—S0, S11 and S12 or coils 117 of the first reading station to be connected to related cam contacts SC9—0, SC11 and SC12 by wires 125.

The energizing circuit for any of the coils 117 of the rotary solenoids is from line side 126, the related SC cam contact, a wire 125, the respective relay contact R101–C–N closed by relay R101, the related S relay coil or magnetic coil 117 to the line side 127. These cam contacts open and close at different times as shown in Fig. 11 and their timing is so selected as to energize the particular S coils or coils 117 and bridge all the remaining contacts 80 which were not bridged or shunted by the brushes 77.

As the S coils or coils 117 are energized in different combinations impulses transmitted by the CR1 cam contacts test the completion of a circuit through contact members 80 by a circuit from the line side 126, through CR1 cam contacts, R4*e* relay contacts now closed, a wire 128, thence through contacts R401*a*, R401*c*, R401*e* and R401*g*, now in the normal position shown in Fig. 16*c* because relay R401 is not energized when a card of the single deck type shown in Fig. 10 is being analyzed, thence by a respective wire 129 to each of the contact members 80a for the four orders shown. The circuit then leads for each order through the contact members 80a–m which are bridged or shunted either by the brushes or the contacts 125 effected by the coils 117 of the rotary solenoids, thence from the final contact member 80m to a plug socket 130. Electrical circuits are shown for only four denominational orders for the first and second reading stations, it being obvious that for 80-column cards these are duplicated to the extent of 80 orders to take care of 80 columns of data. Hence, it is obvious that for analysis of the conventional "IBM" statistical card the impulse circuit is completed between contact members 80a to 80m to emit pulses at plug sockets 130.

Assuming now that the card is perforated with the 7 hole in column 1 and the brush 77 at the 7 index point position has bridged contacts 80j and 80k, the remaining contact members 80 will not be bridged. During the machine cycle the CR1 cam contacts transmit digit impulses 9, 8, 7, 6, 5, 4, 3, 2, 1 and 0 (see Fig. 11) and at each of these impulse times cam contacts SC0 to 9 will energize the related coils 117 to thereby bridge or shunt a pair of contact members by the energization of the related coil 117 of the rotary solenoid. At the 7 impulse time CR1 cam contacts transmit an impulse to the contact member 80a. At the same time, referring to Fig. 11, cam contacts SC9, SC8, SC6–0, SC11, SC12 have energized their respective coils 117 of the rotary solenoids so that the remaining contact members between 80–a and 80–m are closed to continue the impulse circuit to the plug socket 130. If, however, the card column was perforated to represent a 2, at the 2 impulse time for the CR1 cam contacts the SC9–3, SC1, SC0, SC11 and SC12 would have energized the respective coils 117 of the rotary solenoids to complete, at the "2" impulse time, the circuit between the contact members 80a to 80m, and a 2 impulse will then be transmitted to the plug socket 130.

The above description has been confined to the impulse circuits for the first reading station but it will be noted that similarly the analyzer at the second reading station may also control digit impulse transmission under control of an "IBM" statistical card analyzed at the second reading station. It will be seen that the impulses from CR1 are also extended by a wire 135 (Figs. 16c, 16d), thence through R5c contacts which are now closed, a wire 136, thence through contacts R403a, R403c, R403e, R403g now in normal position, due to the deenergization of the relay R403 because a single deck card is being analyzed, to the contact members 80a for each of the denominational orders at the second reading station. Upon completion of the circuit between contact members 80a and 80m in the manner described, impulses appear at plug sockets 137 for the second reading station. Similarly, the coils 117 (Fig. 16b) for the rotary solenoids of the second reading station which are designated S9a–0a, S11a and S12a are also energized under control of the respective cam contacts SC9—SC0, SC11 and SC12, it being noted that wires 138 are connected to wires 125, thereby completing the circuit from each wire 138 through the respective R103B—M relay contacts to the related S9a to S0a, S11a and S12a or coils 117 of the rotary solenoids, to the line side 127. Relay coil R103 is energized by circuits to be subsequently described when it has been detected that the card at the second reading station is a card of the form shown in Fig. 10. Thus, for the second reading station the analyzer and the related impulse circuits also convert the punched card designations of an "IBM" type of card to differentially timed impulses which appear at the plug sockets 137.

*Operation of analyzer and digit emitter circuits for duo-deck 1, 2, 4, 8 coded cards*

The present machine is also adapted to be controlled by duo-deck combinationally coded cards of the forms shown in either Figs. 12 or 14. Upon sensing a special designation in column 160 that such a card is a duo-deck combinationally coded card the impulse circuits are selected to be controlled by the analyzers at either reading station to transmit digit impulses according to the punched holes on the card.

From Fig. 12 it will be seen that the duo-deck card is divided horizontally to provide 80 card columns in the upper deck, the six index point positions from the top to the bottom of the upper deck being Y, X, 1, 2, 4 and 8. A duplicate arrangement is provided for the lower deck in order that columns 81 to 160 may also represent 80 digits. With this arrangement the digit representing capacity is doubled over the "IBM" card. By a coding utilizing the 1, 2, 4, 8 binary combination shown in the table below all of the digits 0–9 may be represented.

TABLE I

9 = an 8 perforation plus a 1 perforation
8 = an 8 perforation alone
7 = a 1 perforation plus a 2 perforation plus a 4 perforation
6 = a 2 perforation plus a 4 perforation
5 = a 4 perforation plus a 1 perforation
4 = a 4 perforation alone
3 = a 2 perforation plus a 1 perforation
2 = a 2 perforation alone
1 = a 1 perforation alone
0 = an X perforation plus a Y perforation It will be seen from the above table that the digits 1, 2, 4 and 8 are represented by single holes alone whereas the other digits require combinations of holes. For example, the digit 3 requires a 2 perforation plus a 1 perforation. The analyzer and coordinated impulse transmitting circuits for each reading station are designed to transmit, as shown in Fig. 13, impulses having precisely the same timing as that derived from the "IBM" type of card. The CR1 cam contacts comprise the source of electrical impulses as before, and the circuit for the first reading station is extended through R4e (Fig. 16c) contacts now closed, and since R401 relay is now energized because a combination hole duo-deck card was earlier detected at the Presensing Station, through either R401b, R401d, R401f, R401h relay contacts now closed, wire 140 to the central contact member 80g of each order. The circuit subdivides at this point and may be completed for the upper deck between the contact members 80a and 80g and for the lower deck between contact members 80g and 80m. When a column in the lower deck is analyzed the circuit is completed to contact member 80m, to a plug socket 130. When a column in the upper deck is analyzed the circuit is completed to contact member 80a, through related relay contacts R401g, R401e, R401c, R401a now closed, and respective wire 142 to a plug socket 141. Plug sockets 141 are provided for the upper deck and plug sockets 130 for the lower deck. A similar arrangement is provided for the second reading station and digit impulses are emitted at plug sockets 137 for the lower deck and plug sockets 230 for the upper deck. By plug connections from these plug sockets digit entering or other operations are controlled.

The manner of transmitting differentially timed impulses from the combinationally coded card of Fig. 12 will now be explained in connection with several examples. The same principle of operation, as previously described, is also embodied in the circuit arrangement of Fig. 16c. That is to say, certain of the brushes 77 will bridge or shunt related contact members 80 and by electro-mechanical means previously described contacts 125 will shunt the other contact members 80 to complete an impulse circuit between contact member 80g and either contact members 80a or 80m.

Taking, for example, the desired transmission of the 9 digit impulse which requires a hole at 8 and a hole at 1, it will be noted that brushes 77 at the 1 and 8 index point positions will shunt their adjacent pairs of contact members 80.

At the 9 impulse time in Fig. 13, cam contacts SC8a, SC7a, SC5a, SC4a will energize the respective coils S8, S7, S5, S4 or the coils 117 of the rotary solenoids for the lower deck, thereby closing related contacts 125 and shunting the remaining 4, 2, X and Y pairs of contact members 80 and thus completing a circuit between contact members 80g and 80m to produce a pulse at the plug socket 130 of the selected order.

From the above description, it will be possible to easily trace out the manner of transmitting the remaining differentially timed digit impulses, it being noted that the perforations utilized to represent a certain digit effect the shunting of certain of the pairs of contact members 80, and at the time the differential impulses are transmitted the remaining contact members are shunted, due to closure of certain contacts 125 by the energization of the desired coils 117 effected by the related cam contacts SC4a—SC9a.

The impulse circuit for cam contacts SC4a—SC9a is from the line side 126 (Fig. 16a), wires 143, through contacts 201D–I now closed because R201 relay is, as will be explained energized as a result of the occurrence of a card coded 1, 2, 4, 8, wires 144 to coils S9—S4 for the lower deck and wires 145 to coils S3, 2, 1, 0, 11, 12 for the upper deck. The above are the energizing circuits for the first reading station.

It will be seen in Fig. 16a that by wires 146 cam contacts SC4a—SC9a are wired to respective relay contacts R203C–H now closed because R203 relay is energized as the result of the occurrence of a card coded 1, 2, 4, 8. From contacts R203C–H there are two sets of wires 147, 148 to energize the two sets of coils S9a—S4a and S3a—S12a for the lower and upper decks of a card analyzed at the second reading station.

*Operation of analyzer and digit emitter circuits for duo-deck 1, 2, 4, 7 coded cards*

According to the present invention, the machine may be responsive to a second type of combinational coded card known as the "two-out of five" coded cards because for each digit two holes are utilized. The digits are represented by holes at the 0, 1, 2, 4, 7 index points as shown in Table II below. The coded card is shown in Fig. 14, and as will be seen it is a duo-deck type of card to represent 160 digits in upper and lower decks.

TABLE II

9 = a 7 perforation plus a 2 perforation
8 = a 7 perforation plus a 1 perforation
7 = a 7 perforation plus a 0 perforation
6 = a 4 perforation plus a 2 perforation
5 = a 4 perforation plus a 1 perforation
4 = a 4 perforation plus a 0 perforation
3 = a 2 perforation plus a 1 perforation
2 = a 2 perforation plus a 0 perforation
1 = a 1 perforation plus a 0 perforation
0 = a 7 perforation plus a 4 perforation There will now be described the modification of the impulse circuits for causing the emission of 0–9 digit impulses under control of the 0, 1, 2, 4, 7 coded card. These impulse circuits are operative for each analyzer when a 0, 1, 2, 4, 7 coded card appears at either reading station. As stated Fig. 14 shows the form of card, Fig. 15 the timing diagram, and Fig. 16a shows the impulse circuits for the 0, 1, 2, 4, 7 card.

The manner of completing the impulse circuits from the CR1 cam contacts through the analyzer at each reading station is exactly the same as for the 0, 1, 2, 4, 8 coded card, the only difference being that the contact members 80a–m not bridged by the brushes 77 are shunted at times as is required for the 0, 1, 2, 4, 7 coded card, and shown by the difference in the timing diagrams of Figs. 13 and 15. As will be later described, R401 and R403 relays (Figs. 16c and 16d) are energized so that the analyzer at either reading station may be conditioned by the card itself to be controlled by the 0, 1, 2, 4, 7 coded card. Also relays R301 and R303 relays (Fig. 16a) are energized as a result of detecting the presence of a 0, 1, 2, 4, 7 coded card to render the common impulse circuits for the two sets of electromagnetic coils operative for each reading station.

In accordance with this required timing cam contacts SC4b–SC9b (Fig. 16a) will energize respective coils 117 at successive digit impulse transmitting times to close certain of the contacts 125 which are complementary to the brushes 77 which have passed through perforations. The energizing circuit is for cam contacts SC5b—SC9b from the line side 126, through cam contacts SC5b—9b, R301, D—H contacts now closed, and for the lower deck of the first reading station through five wires 149, related five wires 144, S5—S9 coils, and for the upper deck through five wires 150, five related wires 145 to coils S3, S2, S1, S0, and S11 of the first reading station.

The above description pertains to the first reading station. For the second reading station impulses are directed from cam contacts SC5b—9b to five wires 151. The impulse circuits then lead through relay contacts R303C–H, five wires 152, five related wires 147 to coils S5a—S9a for the lower deck and five wires 153 and five related wires 148 to coils S3a—S11a for the upper deck of the second reading station.

Because the code utilizes only five digit positions the 6th index point position remains blank and for proper operation of the circuit the SC4b cam contact is adapted through R301I relay contacts and wire 154, or 155 to energize the S4 or S12 coils for the first reading station. For the second reading station there is from contacts SC4b a wire connection 156, the circuit then passing through relay contacts R203H, wires 157 and 158 to respective coils S4a and S12a of the second reading station. Cam contact SC4b energizes these coils to bridge the contact members at the 6th or blank index point position continuously through the impulse digit transmitting portion of the cycle.

For example, at the 9 digit impulse transmitting time the brushes 77₁ and 77₂ will have bridged their related pairs of contact members 80 through the 7 and 2 holes, whereas the SC8b, SC6b, SC5b, as well as SC4b cam contacts will cause the closure of related contacts 125 to shunt the remaining pairs of contact members 80. Hence, a circuit will be completed between the contact member 80a and 80g for the upper deck to cause a 9 digit impulse to be transmitted to a plug socket 141 or 230, depending upon the reading station involved.

The same mode of operation is carried out for transmitting the remaining digits and can easily be traced out, it being noted that in each case the brushes 77 for the combination of two holes to represent a certain digit, cause the shunting of related two pairs of contact members 80 and the remaining pairs of contact members in the impulse circuit are shunted by the electro-mechanical contacts 125 under control of the selected rotary solenoids energized by the SC4b—SC9b cam contacts.

As described for the 1, 2, 4, 8 combinational hole duo-deck card, when magnet R303 (Fig. 16a) is energized the six SC4b—SC9b cam contacts also transmit energizing impulses to the two sets of magnets 117 for both the upper and lower decks of the second reading station. However, which columns are selected for operation is dependent upon the plug wire connections from plug sockets 137 and 230 (Fig. 16d). Also which reading station is utilized is dependent upon which magnet R301, R303 is energized.

*Detection of the presence in presensing station of the various types of coded cards*

Figure 1:
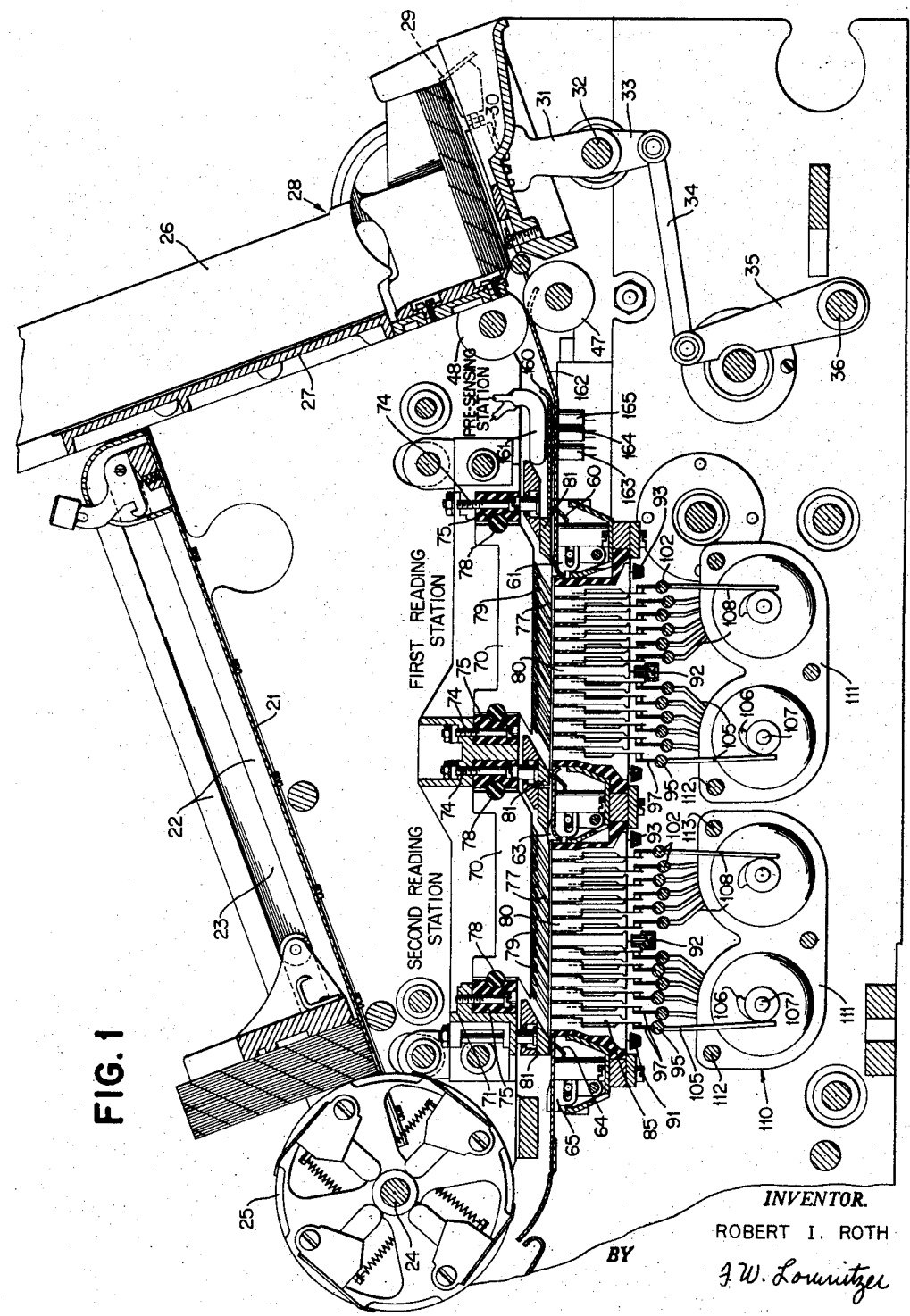
Fig. 1 is a longitudinal sectional view of a card feeding and analyzing mechanism of a well known type, showing the Presensing Station for ascertaining herein the kind of coding used for each card, and showing the adjacent first and second reading stations.

It will be recalled, referring to Fig. 1, that the card magazine is adapted to have therein a series of differently coded cards which may be interspersed or arranged in any desired order. Since the different groups of energizing circuits for the rotary solenoids are selected in accordance with each of the three different types of cards there is preferably a presensing of each card before it enters the first reading station to determine the type of coded card to select the appropriate group of code conversion circuits.

As best shown in Fig. 1 the upper card guide plate 160 carries a conventional neon or high voltage fluorescent lamp 161 which is tubular in form. Said lamp 161 is arranged to illuminate column 80 of the card shown in Fig. 10 which is correspondingly aligned with column 160 of the coded cards of Figs. 12 and 14 and said lamp 161 is of such length that it can sense the 7, 6, or 5 hole positions of said columns. The upper guide plate 160 is perforated longitudinally so that the light can shine through any of these perforations and activate one of three photocells 163, 164 and 165 attached to the lower guide plate 162.

It is assumed in the present embodiment that a card perforated at the 5 index point position which designates the "IBM" type of card will activate the photocell 163. A card coded 1, 2, 4, 8 is perforated in column 160 (see Fig. 12) at the 6 index point position and such hole will activate the photocell 164. In the same way a perforation in column 160 at the 7 index point position will designate that such card is coded according to 0, 1, 2, 4 and 7 code and thus activate the photocell 165.

As will be made clearer later on, the activation of each photocell conditions certain circuits so that when the card appears successively at the first and second reading station the desired group of energizing circuits for the rotary solenoids will be called into operation for the analyzer at the first and second reading stations.

When the photocell 163 is activated the latter will start a chain of operations so that relay R101 (Fig. 16b) will be energized during the cycle that the "IBM" card of Fig. 10 is being analyzed at the first reading station and by circuits to be subsequently explained relay R103 (Fig. 16b) will be energized in the next cycle when this same "IBM" card is analyzed at the second reading station.

The R101 relay will close its C—N contacts and the R103 relay will close its B—M contacts so that each relay will cause energizing impulses to be transmitted from the SC9—SC12 cam contacts to the rotary solenoids to effect shunting of pairs of contact members for the analyzers at the first and second reading stations to render said analyzers responsive to the "IBM" form of card.

If a card of the 1, 2, 4, 8 coded type shown in Fig. 12 appears at the Presensing Station, by circuits to be subsequently explained, the hole at the 6 index point position at column 160 will cause the photocell 164 to be activated and then cause the R201 relay to be energized to close its R201D—I relay contacts as the card appears at the first reading station. As the card appears at the second reading station the R203 relay will be energized to close the R203C—H contacts. Both relays will cause the energization of the rotary solenoids for the analyzers at both the first and second reading stations to render the analyzers responsive to the 1, 2, 4, 8 coded card.

In the same way, if a card of the type shown in Fig. 14 is fed from the supply magazine to the Presensing Station, its type of card designation at the 7 index point position will cause photocell 165 to be activated and by circuits to be subsequently explained the R301 relay will be energized when this type of card is presented at the first reading station, and the R303 relay will be energized when the card shown in Fig. 14 is presented at the second reading station. The relays R301 and R303 close their respective contacts to direct the appropriate impulses to the rotary solenoids to cause the analyzers at either the first or second reading station to be responsive to the 1, 2, 4, 7 coded card as it appears thereat.

It will then be evident that the selective energization of the relays R101 and R103, R201 and R203, R301 and R303 to perform their functions of selecting the desired group of energizing impulses for the rotary solenoids is determined by the type of coded card presented at the Presensing Station.

*Electrical starting circuits*

The electrical machine starting controls in the present machine are substantially similar to those in the patent to G. F. Daly, No. 2,510,559 and reference may be had to Fig. 16 of this patent. It should be noted that the timing of some of the contacts in Fig. 17 herein is somewhat different from the timing shown in Fig. 15 of Patent No. 2,510,559 in order to carry out certain operations in the present machine.

Assuming now that the motor of the machine is running and cards are placed in the magazine, magazine contacts 170 (Fig. 16e) which are well known in the art are closed by a mechanical member 171 which is actuated by the presence of cards in the magazine. By an obvious circuit, closure of contacts 170 energizes the R1 relay and R2 relay in shunt therewith. These relays are energized continuously (see Fig. 19).

Depression of the start key 172 (Fig. 16h) will complete a circuit from the line side 126 through stop key contacts 173a, start key contacts 173b to the R9 relay which closes the R9a holding contacts and the hold circuit is effected by cam contacts CR4 back to the line side 126. With R9b relay contacts now closed closure of CR3 cam contacts during the time CR4 cam contacts are closed will complete an obvious circuit to the R10 relay which closes its hold contacts R10a to hold relay R10 through CR2 cam contacts.

R10 relay closes R10b relay contacts (Fig. 16h, at the bottom) to complete a circuit from line side 126 through R10b relay contacts, wire 174, CR78 cam contacts to the picker clutch magnet 37 which, upon energization, engages the card feed clutch (see Fig. 2) to thereby feed the lowermost card from the supply magazine to the Presensing Station in order that it be determined the type of coded card which is to control the machine.

A branch circuit extends by wire 177 (Fig. 16h, lower right) to the R11 relay coil to the line side 127. R11 relay closes its hold contacts R11a and a hold circuit is completed through these contacts and R10b contacts to the line side 126. The card feed clutch magnet 178 which is similar to the card feed clutch magnet 280 of Fig. 21a of Patent No. 2,510,559 is also energized in the first card feed cycle by a circuit from the line side 126 through relay contacts R10b, R4d relay contacts, CR79 cam contacts, clutch magnet 178 to the line side 127.

As a card feeds into the Presensing Station it actuates a card lever 175 (Fig. 16e) to close contacts 276, which are designated by the same number in Patent No. 2,510,-559 (see Fig. 3), thereby completing a circuit from the line side 126 through CR34 cam contacts which cam contacts are closed between 288° and 312° of the first machine cycle at the time that the Presensing Station contacts are closed.

A circuit is then extended by a wire 179, R3 relay coil (Fig. 16h) to the line side 127. R3 relay closes the hold contacts R3a, completing a hold circuit back to the line side 126 through the CF4 cam contacts. R3c relay contacts (Fig. 16h, bottom) thereupon close to complete a circuit from the line side 126, through CR1b cam contacts, R3c relay contacts, R11b relay contacts now closed to clutch magnet 182 to the line side 126. Said gripper clutch magnet 182 corresponds to the gripper clutch magnet 153 of Patent No. 2,510,559 referring to Figs. 4 and 16.

R3 relay is energized at the end of the first cycle (see Fig. 19) and while cam contacts CF4 are closed CF18 cam contacts (Fig. 16h) close early in the second cycle to complete a branch circuit through R3a contacts, wire 176, CF18 cam contacts, R4 relay coil to line side 127. A hold circuit is provided by R4a relay contacts, CF3 cam contacts, to line side 126. Referring to Fig. 16c the R4 relay closes R4e relay contacts to cause impulses from CR1 contacts to be transmitted to the analyzer at the first reading station. R4 relay is continuously energized.

When the first card appears at the second reading station R5c contacts (Fig. 16d) are closed by circuits now to be described to cause impulses from CR1 cam contacts to be transmitted to the analyzer at the second reading station.

At the end of the second cycle (see Fig. 18), cam contacts CF19 close to extend a circuit from line side 126, CF3 contacts, R4a relay contacts, wire 166, CF19 cam contacts, R5 relay coil, line side 127. A hold circuit is effective through R5a relay contacts and CF2 cam contacts. The R4 and R5 relays are continuously energized because their hold circuits extend through R2a and R2b contacts, back to line side 126.

*Electrical circuits for detecting type of card and conditioning machine accordingly*

So far it will be seen that in the first card feed cycle, referring to Fig. 19, circuits are completed to feed the lowermost card from the magazine to the Presensing Station. There will now be described the circuits which are effective as a result of sensing the type-of-card designation on the card at the Presensing Station. It will be assumed by way of example that the first card is a conventional "IBM" card having a "5" card type designating hole in column 80, as shown in Fig. 10.

As was previously stated, the coordination of the 5 hole with the photocell 163 (see Fig. 1) in the Presensing Station will cause the latter to be activated.

Figure 16E:
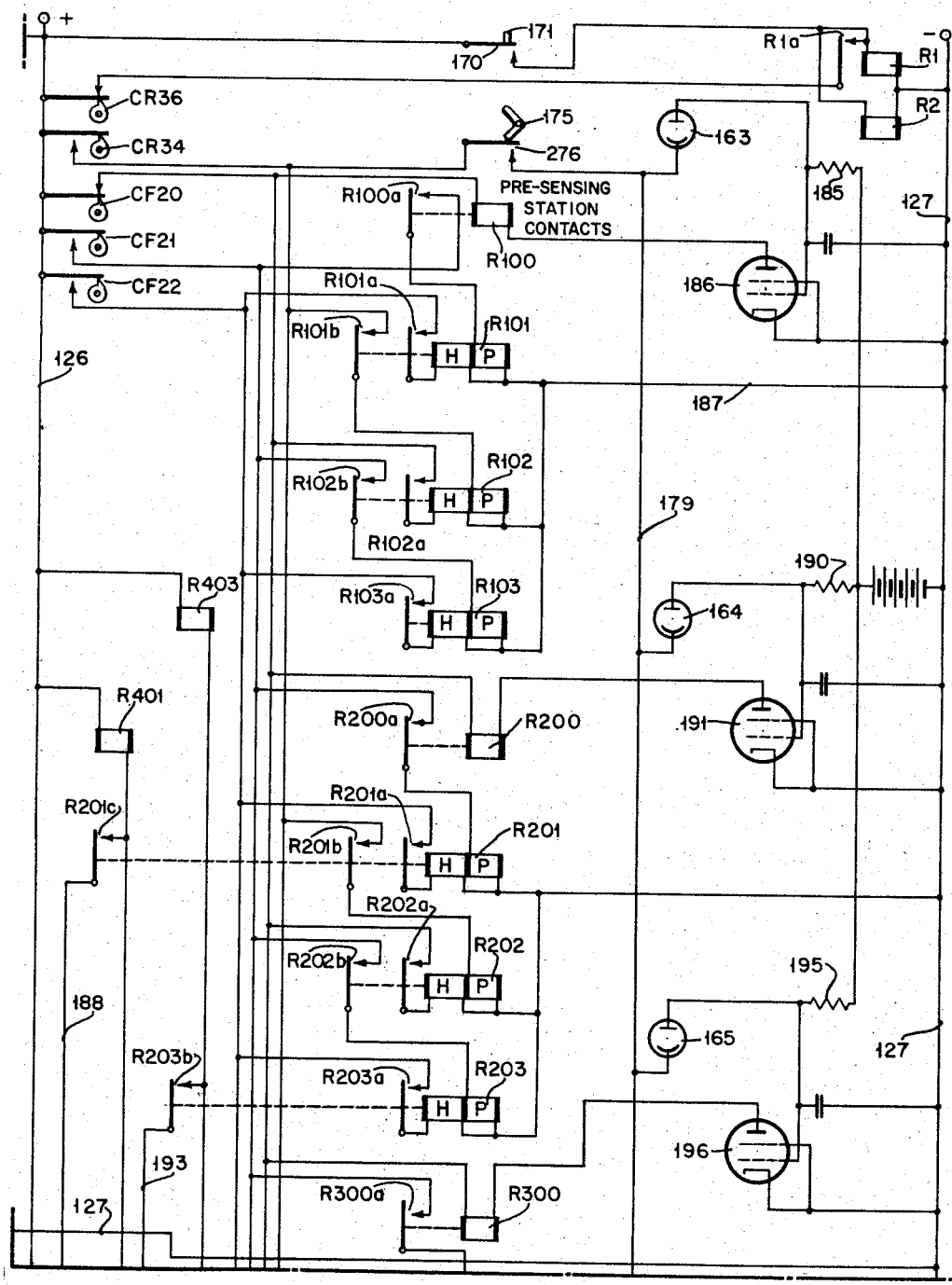
Figure 16G:
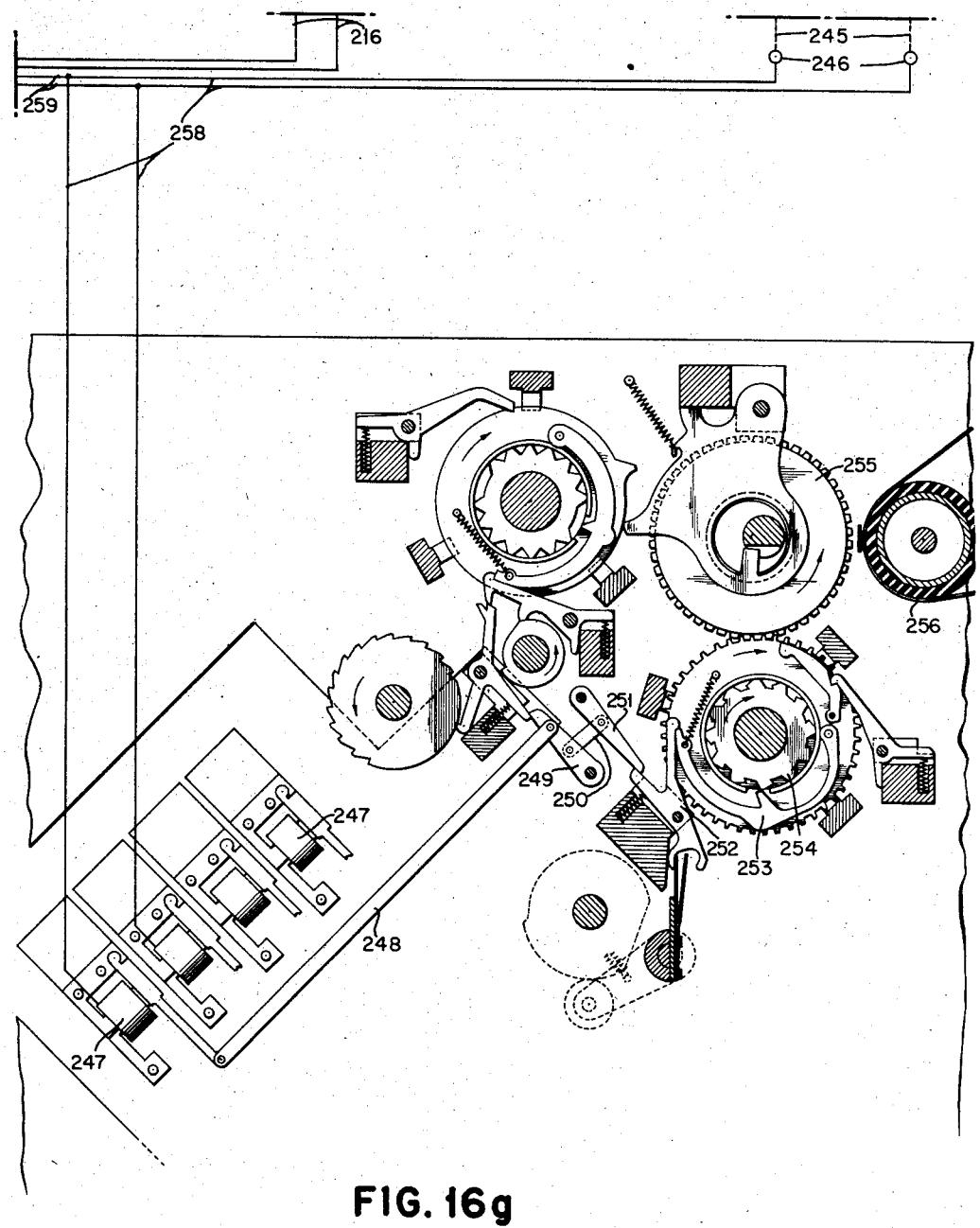
Figure 16H:
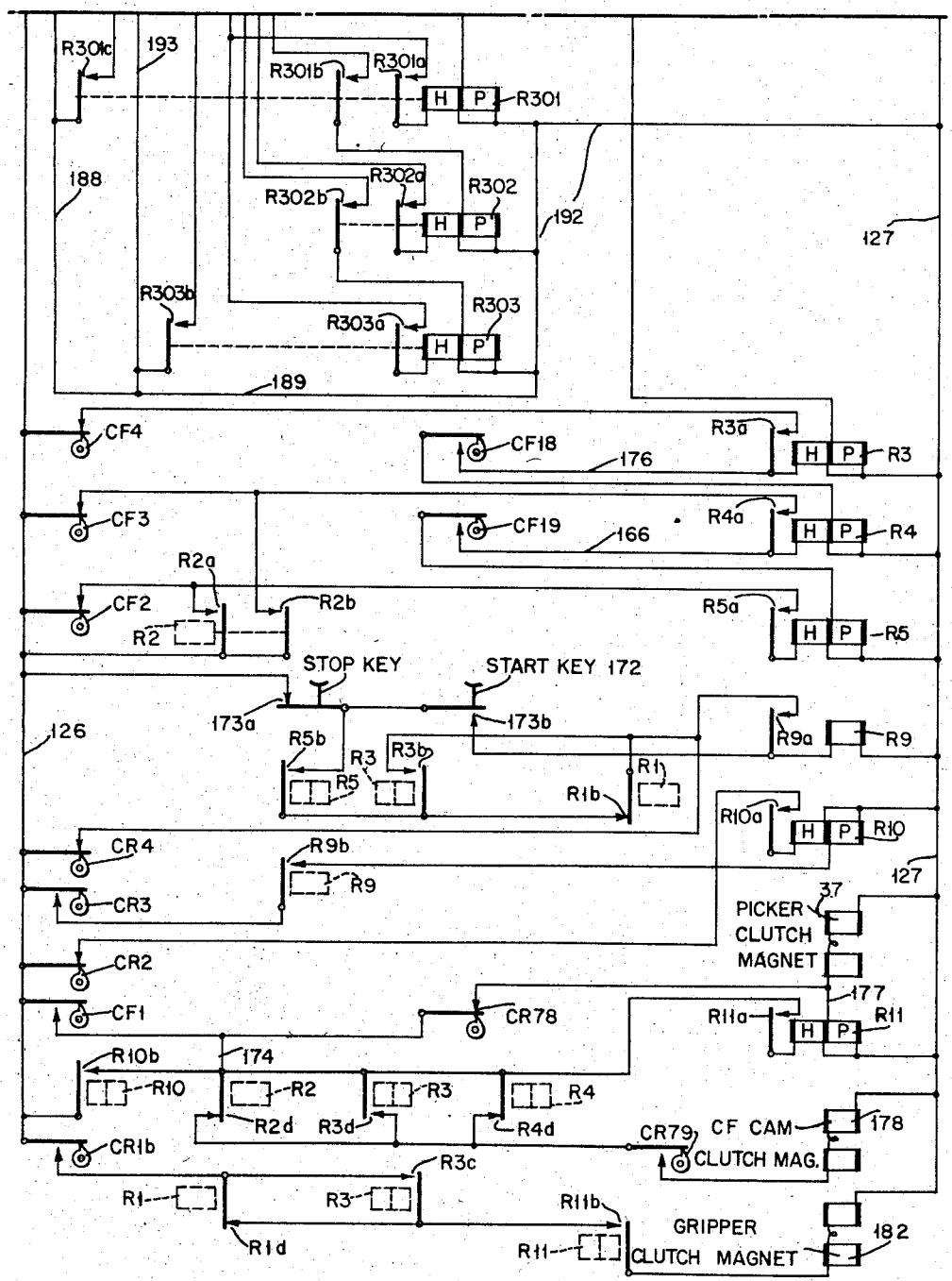

Referring now to Fig. 16e, the illumination of the photocell 163 will cause increased current flow through a resistor 185. When cam contacts CR34 close at the end of the first cycle the control grid of a thyratron 186 is raised to approximately ground potential, thereby causing the thyratron to be conductive. Therefore, when CF20 contacts close at the time CR34 cam contacts are closed, a circuit will be completed to a relay coil R100. Cam contacts CF20 will hold the R100 relay energized into the second machine cycle during which cycle the first card is fed to the first reading station for analyzing operation and the second card in the magazine is fed to the Presensing Station. Just prior to the time that the analyzer at the first reading station analyzes the card cam contacts CF21 close, thereby completing a circuit from the line side 126, cam contacts CF21, R100a relay contacts, D101 relay coil to the line side 127. A hold circuit is completed from the line side 127 through R101a contacts and cam contacts CF22. It will be noted then that relay R101 is energized all during the time that the analyzer analyzes the card at the first reading station. The first reading station is usually employed for group control purposes which are not explained herein since it forms no part of the present invention. Cam contacts CF22 are closed between 100° to 315° as shown in Fig. 18 which of course, is during the time that the digit impulses 9—0 are transmitted as a result of the energization of the rotary solenoids by the cam contacts SC9—SC0, as shown in Fig. 11. It will be remembered that R101 relay closes the C—L relay contacts, thereby causing for digit transmission the energization of the rotary solenoids S9—S0 to be placed under control of the contacts SC9—SC0, respectively.

The operation of the machine with respect to analysis of the type of card shown in Fig. 10 has been previously described in the section designated "Mode of Analyzing and Digit Transmitting Operations for "IBM" 80–Column Punched Cards." In this respect the circuit for energizing the R4 relay to close R4e contacts (Fig. 16c) to cause CR1 impulses to be transmitted to the first reading station analyzer has been described.

In the type of record controlled accounting machine in which the present invention is preferably embodied, it is desirable to have a second reading station for digit entering purposes which is shown diagrammatically in Fig. 16d. At this station the card is re-analyzed and the desired digit entry operations which are later described may be effected under control of digit impulses transmitted under control of the analyzer at the second reading station.

It was also stated that selection of the appropriate impulses to energize the rotary solenoids for the second reading station is effected by the energization of the R103 relay (Figs. 16b and 16e) which closes its contacts R103B–M (Fig. 16b) to thereby cause for digit transmission involved herein cam contacts SC9—SC0 to energize the rotary soleniods S9a to S0a of the analyzer at the second reading station. The energizing circuits for relay R103 are shown in Fig. 16e wherein it will be seen that the R101 relay closes its contacts R101b so that a circuit is completed through the CR34 cam contacts, R101b relay contacts, R102 relay and a wire 187 to line side 127. R102 relay is energized at the end of the second cycle. (See Fig. 19.) R102 relay closes R102a relay contacts, completing a hold circuit to the line side 127, through the hold coil R102, R102a relay contacts and cam contacts CF20 which holds the R102 hold relay coil energized to the end of the second cycle and part of the third card feed cycle. Said relay coil R102 closes supplemental contacts R102b, thereby completing a circuit when cam contacts CF21 close to the pickup coil of the R103 relay during the beginning of the third cycle. Said relay closes hold contacts R103a and CF22 cam contacts maintain the energization of the hold coil of the R103 relay during the digit impulse transmitting portion of the third card feed cycle.

Summarizing the above description, upon sensing of a type designation of a card at a presensing station, circuits condition the analyzer in order that the card may be analyzed at the first reading station and automatically other circuits condition the machine so that the analyzer at the second reading station will be operative to analyze this same card in a subsequent cycle.

During the second card feed cycle the second card is fed from the supply magazine to the Presensing Station and it will be assumed that this card is of the type shown in Fig. 12 and has a hole at the 6 index point position of column 160 designating that this card employs the 1, 2, 4 and 8 code. When the "6" hole is coordinated with the photocell 164 (see Fig. 1) light will strike the latter and the illumination of photocell 164 will cause an increased current flow through the resistor 190 (Fig. 16e) when cam contacts CR34 close; thus raising the bias on the control grid of thyratron 191 and permitting it to conduct to energize R200 relay when cam contacts CF20 close. The latter will hold R200 relay energized over to the third machine cycle, at which time cam contacts CF21 will effect the energization of the R201 relay through the R200a relay contacts. The R201 relay is held through its hold contacts R201a and cam contacts CF22 and thus retains the R201 relay energized during the reading portion of the third cycle.

Now, referring to Fig. 16a, R201 relay will close its R201D–I relay contacts, thereby causing the rotary solenoids S9—S12 of the first reading station to be energized under control of the cam contacts SC4a—S9a. As was previously described, the 1, 2, 4, 8 coded card has two decks and it is, therefore, necessary to condition the analyzer at the first reading station to be responsive to both decks so that impulses appear at plug sockets 130 and 141.

It will be recalled that for two deck card analysis in the first reading station the R401 relay is energized to close the R401b, R401d, R401f and R401h contacts to transmit CR1 impulses to contact members 80g for each order. (See Fig. 16c.)

The energizing circuit for the R401 relay is from the line side 126, R401 relay (Fig. 16e), R201c contacts now closed, wires 188 (Fig. 16e, 16h), wires 189, 192 to the line side 127. Obviously, R401 relay is energized concurrently with the R201 relay.

The 1, 2, 4, 8 coded card, of course, is subsequently fed to the second reading station and accordingly the analyzer at the second reading station is automatically conditioned to decode the card of this third type. This is effected when the R201 relay closes the R201*b* (Fig. 16*e*) contacts to energize the R202 relay when cam contacts CR34 close. Relay R202 is held through its R202*a* relay contacts and cam contacts CF20. Said relay 202 closes the R202*b* relay contacts and the latter in turn cause the energization of the R203 relay which is held through the R203*a* contacts and cam contacts CF22. Thus, referring to Fig. 16*a* the R203 relay closes its R203C–H relay contacts and now the rotary solenoids S9*a* to S12*a* of the second reading station are energized under control of cam contacts S9*a*—S4*a*. The R203 relay closes the R203*b* contacts (Fig. 16*e*) to complete a circuit from line side 127, R403 relay R203*b* contacts, wires 193, 189, 192 (Fig. 16*h*) to line side 126. R403 relay closes the R403*b*, *d*, *f*, and *h* relay contacts (Fig. 16*d*) to condition the analyzer at the second reading station to respond to two decks for the 1, 2, 4, 8 coded card. Thus, a card of the type shown in Fig. 12 is successively analyzed at the first and second reading stations in successive card feed cycles. Of course, when the second card is at the first reading station the first card is at the second reading station during the third card feed cycle and hence the two analyzers are capable of concurrently analyzing two different types of coded cards in the same or third card feed cycle. This may not be necessarily the condition since, in the second card feed cycle, the second card fed from the supply magazine to the Presensing Station might have been of the same type as the Fig. 10 card assumed to have been fed in the first card cycle; that is, an "IBM" coded card. In this event since the R100 relay has been deenergized it may again be picked up by the activation of the thyratron 186 and said relay in turn energizing the R101 relay will cause the latter to be effective for rendering the analyzer at the first reading station responsive to a card of the type shown in Fig. 10. In the same manner, the intermediate relay R102 is energized to energize R103 relay so that this card is then analyzed at the second reading station, all in the manner previously explained.

During the third card feed cycle the third card is presented to the Presensing Station during which cycle the first card fed is at the second reading station and the second card fed is at the first reading station. It will be assumed that the third card is of the type shown in Fig. 14 which is a duo-deck card coded according to 0, 1, 2, 4, 7 code and to characterize this type of card the card contains at column 60, if so desired, a type-of-card designating perforation at the 7 index point position. When this card is at the Presensing Station (see Fig. 1) this hole will be coordinated with the photocell 165 and by the lamp shining through such hole photocell 165 will be activated by a CR34 pulse to wire 179. When cam contacts CR34 close the increased current flow through a resistor 195 will permit thyratron 196 to be active. Cam contacts CF20 close at the same time as CR34 contacts to cause the energization of the relay R300. The series of relays R300, R301, R302 and R303 are energized in sequence in the same manner as the other groups of relays in the 100 and 200 series and, therefore, only a general description will be given of the circuits and the functions controlled by each relay. R300*a* contacts close to pick up R301 relay (Fig. 16*h*) which holds through its R301*a* contacts so that during the fourth card feed cycle closure of contacts R301D–I (Fig. 16*a*) will cause impulses from cam contacts SC4*b*—SC9*b* to energize the rotary solenoids S9—S0 of the first reading station to analyze the 1, 2, 4, 7 coded type of card shown in Fig. 14. It will also be noted that the R301 relay closes the R301*c* relay contacts (Fig. 16*h*) to pick up the R401 relay so as to condition the analyzer at the first reading station to be responsive to a double deck card.

The R301*b* contacts close to pick up the intermediate relay R302 which closes its contacts R302*b* and the latter in turn pick up the R303 relay which is energized during the fourth card feed cycle. The R303 relay closes its contacts R303C–H (Fig. 16*a*) so that cam contacts SC4*b* to SC9*b* transmit impulses to the rotary solenoids S9*a*—S9*a* of the second reading station. R303*b* contacts (Fig. 16*h*) also close to energize the R403 relay which closes its contacts R403*b*, *d*, *f* and *h* at the second reading station to enable it to be responsive to a duo-deck type of card.

Thus, referring to Fig. 19 successive card feed cycles ensue, it being noted that during the fourth card feed cycle there are two cards at the two reading stations, a card at the Presensing Station, and at this time the first card will be fed to the stacker.

In the fifth card feed cycle the same conditions occur, it being noted that the fifth card is now fed to the Presensing Station. It is immaterial as to the type of card fed for this card feed cycle, since it may be any of the three types; and in accordance with the type-of-card designation the analyzers will be conditioned as the card is presented at the first and second reading station to condition the analyzers thereat to analyze this type of card.

So far the description has been confined to the feeding of cards of different type and their analysis at the different reading stations without any reference to the particular operations which may be effected at each of the reading stations. While it would be impractical to describe each of the functions which can be performed at each of the stations, it is well known that in the present art where differentially timed digit impulses are transmitted as the result of the analysis of a card, various operations may be performed. It is evident from recourse to Figs. 11, 13, and 15 that the same timed digit impulses are transmitted as a result of the analysis of the three different types of cards which enables the cards to control the same entering, printing and other operations under control of the card per se. There will now be described, by way of example, how some of these operations can be carried out.

*Direct entries from second reading station into accumulators*

With the present invention it is also possible to effect entries into an accumulator under control of perforated columns of any of the three types of records. In the present invention each type of record shown in Figs. 10, 12 and 14 is analyzed and converted into the same differentially timed impulses and this makes it possible to enter amounts in the same accumulator irrespective of the type of coded card passed through the machine.

Any suitable form of accumulator may be coordinated with the present improvement but it is preferable to employ a type which is well known in the art and efficiently operates by differentially timed electrical impulses. In Fig. 16*f* one order of the preferred type of accumulator is shown in detail and it will be understood that all orders are alike. For further details of construction and operation reference may be had to Patent No. 2,328,653 to C. D. Lake et al., issued September 7, 1943. The pivoted armature 200 is between the cores of the advance magnet AM and stop magnet SM and said armature has a swivel connection to a clutch lever 201. In the declutching position of the clutch lever 201 shown in Fig. 16*f* the armature 200 is biased against the SM magnet. Whenever the AM magnet is energized the armature 200 will take an alternative position, rocking the clutch lever 201 to a clutching position and is held in such position by a latch 202. When the said armature 200 is against either the AM or SM magnet it will remain in such biased condition by latch 202. The lever 201 is shown in declutching position and when moved to a declutching position it releases a disk 203 for counter-clockwise movement and a spring 204 is now effective to rock a clutch pawl 205 into engagement with a ratchet wheel 206 which is fixed to a constantly rotating gear 207. As a result of this clutching operation an accumulator element 208 on which the clutch pawl 205 is pivoted is initiated in rotation. The termination of the rotation of the accumulator element 208 is effected as a result of the SM magnet by circuits fully shown in the last mentioned patent. This will attract the armature 200, rocking the clutch lever 201 to declutching position. It is evident, therefore, that the transmission of a differentially timed impulse to the AM magnet will cause a differential rotation of an accumulator element in each order, thereby accumulating the items represented in the controlling fields.

The energization of the AM magnets by impulses directly from the analyzer is known as the "Direct Entry" method, and is described herein as one form of entry which may be utilized in connection with the present invention.

It will be then assumed that columns 1 and 2 of the card of Fig. 10 and columns 81 and 82 of the two different types of coded cards shown in Fig. 12 and Fig. 14 are perforated to represent amounts to be entered in a common accumulator. The presence of each of such types of cards in the second reading station effects the energization of the R103, R203 and R303 relays as has been described. These relays close their respective contacts R103, N, O, R203, J, K and R303, J, K (see Fig. 16d). Therefore, impulses from the plug hubs 230 of columns 81 and 82, and from plug hubs 137 for columns 1 and 2 will be transmitted by plug wires 210 to plug hubs 211, 212, 213, thence through the respective relay contacts of relays R103, R203, R303 just mentioned and plug connections 214 to plug hubs 215 and by wire connections 216 (Figs. 16d, 16g, 16f) to terminal connections for the AM magnets which for each order are connected to the line side 127. While in the assumed example it has been shown how three types of coded cards effect entries in these two accumulator orders, it is understandable that it is only necessary to have relays R103, R203, and R303 make the connection between the plug hubs 215 and the plug hubs of the controlling column of the second reading station. In this manner all types of cards shown in Figs. 10, 12 and 14 may cause the entries in the common accumulator. On the other hand, selective entries may be effected by having relays R103, R203 and R303 function as class selectors so that items of only selected types of coded cards will be entered in an accumulator.

*Listing and effecting accumulator entries*

In this section there will be described how entries on cards may be effected into an accumulator and may be concurrently printed by a well known type of printing mechanism. It will be assumed in this mode of operation that cards of the Figs. 10 and 12 type cause selective entries into two accumulators and selective printing of amounts. The form of accumulator is preferably identical to that previously described and shown at the left of Fig. 16f.

The printing mechanism is well known in the art, and fully shown and described in a number of patents, among which is the patent to R. E. Page et al., No. 2,438,071, issued March 16, 1948, and the application of Robert I. Roth, Serial No. 561,199, filed January 25, 1956, now Patent No. 2,813,479. For this reason, the printing mechanism is only shown diagrammatically in Fig. 16g, it being understood that the arrangement is duplicated for more orders. Impulses from plug sockets 240 for columns 83 and 84 are directed by plug wires 241 to plug hubs 242. The circuit then extends through contacts R203L and R203M to plug hubs 243 and thence by respective plug connections 244 and 245 to plug hubs 246 (Fig. 16g) which have wire connections 258 to print control magnets 247 corresponding to the print control magnets 26 of the aforementioned patent application, Serial No. 561,199, now Patent No. 2,813,479. Thus, differentially timed impulses will energize said magnets 247. The manner of setting up the printing mechanism is fully shown in the aforementioned patent application and briefly each magnet 247 when energized actuates a link 248 to rock a connected lever 249, and by a link 250 a lever 251. Said lever 251 actuates a triple arm clutch release member 252 at different times to release and cause a clutch member 253 to engage the teeth of a constantly rotating fluted shaft 254. Said clutch engagement causes the rotation of a type wheel 255. The type wheel carries digit printing characters and in accordance with the time of engagement of the clutch member 253, digit type are selected and impressed against a platen 256. The mechanism just described is duplicated for each of the two orders in order that units and tens digits appearing on the Fig. 12 type of card are printed.

Accumulator entries are preferably effected concurrently with the item printing operations by the type of printing mechanism just described. The initiation of the rotation of the accumulator wheel is under control of impulses from plug hubs 246. It will be seen that wires 259 connected to the AM magnets of a second accumulator are connected to wires 258. These interconnections also cause the transmission of differentially timed impulses to the AM magnets of the units and tens orders. Thus, it will be evident that amounts are not only printed but they are also entered in the respective accumulator orders.

It was previously intimated that amounts appearing in columns 3 and 4 are also printed and entered in a related accumulator. From Fig. 16d, it will be seen that plug connections 260 are made from the plug hubs for columns 3 and 4 to plug hubs 261. The circuit then continues for each plug hub through respective contacts R103Q and R103R to plug hubs 262. The plug connections from plug hubs 262 to the print control magnets 247 for these two orders and to the two orders of the related accumulator unit are not shown since they are a duplicate of the connections made for columns 83 and 84. It should be noted that amounts in columns 3 and 4 are entered in these printing and accumulating orders only when a Fig. 10 type of card appears at the second reading station because of the closure of contacts R103Q and R103R.

In the present description it has been assumed that only cards of the Figs. 10 and 12 types control selective entries into two accumulators and selective printing of amounts. However, the present arrangement is not restricted to control by cards of only two types since cards of the type shown in Fig. 14 may also control selective entry into a respective accumulator and a selective printing of the corresponding amounts. In view of the preceding description it is believed unnecessary to describe the complete plugging arrangement. Plug connections are made from the plug hubs 137, 230 or 240, depending upon the controlling columns, to plug hubs 263. The R303 relay closes its respective contacts R303L and M to extend the circuit to plug sockets 264.

It will be recalled that the R303 relay is the one which is energized when cards of the Fig. 14 type are passed through the machine.

From said plug sockets there are plug connections 265 to plug hubs 266. From the latter plug connections may be made to respective plug hubs connected to the print control magnets 247 or alternatively from the plug hubs 266 plug connections may be made directly to an accumulator of the type shown in Fig. 16f.

The present and the preceding sections describe by way of example some of the useful arrangements of the present machine. However, these are not restrictive and according to the knowledge possessed by skilled persons other obvious arrangements can be utilized. With the wide flexibility of controls afforded by the relays R103, R203, and R303 a wide variety of selective entry and printing operations can be carried out.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims:

What is claimed is:

1. In a machine controlled by separate data elements bearing differently coded entry control designations and bearing designations separate from said entry control designations for designating the kind of code utilized for said entry control designations, means to analyze said entry control designations on each of said elements, means for sensing said kind of code designations for detecting the code utilized for the element analyzed by said analyzing means, and means controlled by said sensing means to cause under control of said analyzing means the conversion of each of said different entry codes to a common entry code.

2. In a machine controlled by separate data elements bearing entry control designations coded according to either a first or second code and bearing designations separate from said entry control designations for designating the kind of code utilized for said entry control designations, means responsive to a third entry code different from said first or second codes to receive said entries, analyzing means to analyze said entry control designations on each of said elements, means for sensing said code designations for detecting the kind of code utilized for the element analyzed by said analyzing means, and means controlled by said sensing means to cause under control of said analyzing means the conversion of each of said first and second codes to said third entry code and for effecting each of said coded entries in said entry receiving means.

3. In a machine controlled by separate data elements bearing entry control designations coded according to a first code, second code or third code, means responsive to said first code to receive said entries, analyzing means to analyze said entry control designations on each of said elements, means for detecting the code of the element analyzed by said analyzing means, means controlled by said detecting means to cause under control of said analyzing means the conversion of said second and third codes to said first code for effecting said second and third coded entries in said entry receiving means, and means controlled by said detecting means to cause under control of said analyzing means said first coded entries to be entered in said entry receiving means.

4. In a machine controlled by separate data elements bearing entry control designations coded according to a first single unit per digit code, or a second code having one or more units per digit in combination, means responsive to a common entry code comprising said first single unit per digit code, analyzing means for analyzing said entry control designations on each of said elements, means for detecting the code of the element analyzed by said analyzing means, and means controlled by said detecting means to cause under control of said analyzing means the conversion of said second code to said common entry or first code for rendering said first named means responsive to entries from data elements utilizing said second code.

5. In a machine controlled by separate data elements bearing entry control designations coded according to a first code in which differential locations of the designations designate the digits or a second code in which one or more designations in combination designates the digits, means responsive to single differentially timed electrical impulses to receive said entries, electrical analyzing means to analyze said entry control designations on each of said differently coded elements, means for detecting the code of the element analyzed by said analyzing means, electrical means selected by said detecting means upon detecting said second code to cause under control of said analyzing means the conversion of said combinational designations of said second code to single differentially timed impulses for effecting entries in said entry receiving means, and further electrical means selected upon detecting said first code for transmitting differentially timed impulses under control of said analyzing means in said entry receiving means.

6. In a machine controlled by separate data elements bearing entry control designations coded according to a first code, or a second different code, means responsive to a common entry code comprising said first code to print said entries, means to analyze said entry control designations on each of said elements, means for detecting the code of the element analyzed by said analyzing means, a plurality of selecting means under control of said detecting means and operable according to the different codes detected, means controlled by said selecting means operable according to the second code to cause under control of said analyzing means the conversion of said second code to said common entry or first code to read out entries in said first code, means controlled by said selecting means operable according to the second code to cause said readout entries to control said printing means, means controlled by the other of said selecting means operable according to the first code to cause said analyzing means to read out entries in said first code, and means controlled by said other selecting means operable according to the first code to cause said readout entries to control said printing means.

7. In a machine controlled by differently coded cards having entry designation bearing holes coded according to one code for uni-deck cards, or coded according to a second code for duo-deck cards, in which each deck can control entries, and each card bearing a type-of-code hole, means for analyzing said entry designation holes, means for analyzing said type-of-code designation holes, means for feeding cards to said analyzing means, said cards being interspersed with respect to the different codes, a plurality of code converting means each for converting each of said different codes to a common entering code, means under control of said type-of-code designation hole analyzing means for selecting in accordance with the code of the card a corresponding code converting means and for causing said analyzing means to effect entries according to said common entering code, and means under control of said type-of-code analyzing means when duo-deck cards are analyzed to cause said analyzing means under control of said converting means to effect independent entries from duo-decks.

8. In a machine controlled by separate data elements bearing entry control designations coded according to a first code, or a second different code, and designations separate from said entry control designations for designating the kind of code, an accumulator responsive to a common entry code to receive said entries, means to analyze said entry control designations on each of said elements, means for sensing said kind of code designations for detecting the code of the element analyzed by said analyzing means, a plurality of selecting means controlled by said sensing means and operable according to the kind of code utilized, and means controlled by said selecting means when operable according to the first and second codes to cause under control of said analyzing means the conversion of said first and second codes to said common entry code to read out entries in said common entry code into said accumulator.

9. In a machine controlled by separate data elements bearing entry control designations coded according to a first code, or a second different code and designations separate from said entry control designations for designating the kind of code, printing means and entry accumulating means both responsive to a common entry code to receive said entries, analyzing means to analyze said entry control designations on each of said elements, means for sensing said kind of code designations for detecting the code of the element analyzed by said analyzing means, and means controlled by said sensing means when operable according to the first and second codes to cause under control of said analyzing means the conversion of said first and second codes to said common entry code to control said printing means and to read out entries in said common entry code into said accumulating means.

10. In a machine controlled by single deck cards or duo-deck cards in which entry designations on single deck cards are coded according to a first code and entry designations on duo-deck cards are coded according to a second code, and said differently coded cards bear type-of-code designations, means for analyzing said entry designations, means for analyzing said type-of-code designations, means under control of said entry designation analyzing means for converting entry designations for each of said codes and transmitting said entries in a common entry code, and means controlled by said type of code analyzing means upon detecting a duo-deck coded card to cause said entry designation analyzing means and said converting means to transmit entries independently for duo decks.

11. In a machine controlled by single deck cards or duo-deck cards, coded according to a first and a second code, means for detecting duo-deck cards, means controlled by said single or duo-deck cards for converting each of said codes for transmitting entries in a common entry code, and means controlled by said detecting means upon detecting a duo-deck coded card to automatically cause entries in said common code to be effected independently for duo decks.

12. In a machine controlled by differently coded cards having entry control designations and separate type of code representing designations, means for sensing said code representing designations for detecting the code on each card, a plurality of entry receiving devices one to receive entries from cards of one code and the other to receive entries from cards of the other code, means controlled by said cards to convert each of said different codes into a common entry code for entry in said entry receiving devices, and means controlled by said sensing means to effect selective distribution of said entries in said plurality of entry receiving devices according to the different codes on said cards.

13. In a record controlled machine for handling differently coded cards utilizing the same form of designation hole for each of said cards and each of said cards having said holes arranged according to a first code and a second code and bearing a designation hole designating the type of code, a plurality of analyzing means, one for analyzing said designation holes and the other said code designation holes, means for feeding cards to said analyzing means, said cards being interspersed with respect to the different codes, a plurality of code converting means each for converting said first and second codes to a common entering code, and means under control of said code designation hole analyzing means for selecting in accordance with the code of the card a corresponding code converting means and for causing said one analyzing means to effect entries according to said common entering code.

14. In a record controlled machine for handling single deck cards coded according to a first code and duo-deck cards coded according to a second code and each of said cards bearing a designation hole designating the type of code, a plurality of analyzing means, one for analyzing said designation holes and the other for analyzing said code designation holes, means for feeding cards to said analyzing means in an unpredetermined sequence, a plurality of code converting means each for converting under control of said designation hole analyzing means each of said different codes to a common entering code, means under control of said code designation hole analyzing means for selecting in accordance with the code of the card a corresponding code converting means and for causing said one analyzing means to effect entries according to said common entering code, and means controlled by said code designation analyzing means upon detecting a duo-deck card to cause the code converting means operable for duo-deck cards to be effective for each of said decks to effect independent entries in said common entering code for both decks.

15. In a machine for handling differently coded cards, each bearing entry designations, and a type-of-code designation, a presensing station having means to analyze the type-of-code designation, a card analyzing station having means to analyze said entry designations, means for feeding cards interspersed with respect to said codes, each in succession to said presensing entry receiving station and said card analyzing station, entry receiving means receptive to a common entry code, a plurality of code converting means each for causing said card analyzing station to convert the code of each of said cards to said common entry code, and means under control of the analyzing means at said presensing station to select in accordance with the code of the card the related code converting means.

16. In a machine for handling differently coded cards, each bearing entry designations, and type-of-code designation, a presensing station having means to analyze the type-of-code designation, a card analyzing station having means to analyze said entry designations, means for feeding cards interspersed with respect to said codes, each in succession to said presensing entry receiving station and said card analyzing station, entry receiving means receptive to a common entry code, a plurality of code converting means each for causing said card analyzing station to convert the code of each of said cards to said common entry code, means under control of the analyzing means at said presensing station to select in accordance with the code of the card the related code converting means, and delay means to render said selecting means effective at the time the coded card is fed to said entry designation analyzing station.

17. In a machine according to claim 16 and including in the combination a plurality of card analyzing stations, card feeding means for feeding a card from the presensing station to one station in one cycle, and to the other station in two cycles, and delay means for rendering the selecting means effective one or two cycles later at the time the coded card is at the respective analyzing station.

References Cited in the file of this patent

UNITED STATES PATENTS 2,614,632   Clos _____ Oct. 21, 1942